United States Patent
Ishiga

(10) Patent No.: US 8,249,341 B2
(45) Date of Patent: Aug. 21, 2012

(54) IMAGE PROCESSING METHOD FOR REMOVING NOISE CONTAINED IN AN IMAGE

(75) Inventor: Kenichi Ishiga, Yokohama (JP)

(73) Assignee: Nikon Corporation, Tokyo (JP)

(\*) Notice: Subject to any disclaimer, the term of this patent is extended or adjusted under 35 U.S.C. 154(b) by 382 days.

(21) Appl. No.: 12/461,913

(22) Filed: Aug. 27, 2009

(65) Prior Publication Data

US 2010/0008574 A1    Jan. 14, 2010

Related U.S. Application Data

(63) Continuation of application No. PCT/JP2008/052747, filed on Feb. 19, 2008.

(30) Foreign Application Priority Data

Feb. 28, 2007  (JP) ................... 2007-049114
Feb. 28, 2007  (JP) ................... 2007-049115

(51) Int. Cl.
*G06K 9/00*  (2006.01)

(52) U.S. Cl. .................... 382/167; 382/162

(58) Field of Classification Search .......... None
See application file for complete search history.

(56) References Cited

U.S. PATENT DOCUMENTS

| | | | |
|---|---|---|---|
| 5,051,842 A | 9/1991 | Shimazaki | |
| 5,134,503 A | 7/1992 | Kimura | |
| 6,603,878 B1 | 8/2003 | Takemoto | |
| 6,621,937 B1 * | 9/2003 | Adams et al. | 382/275 |
| 6,754,398 B1 | 6/2004 | Yamada | |
| 6,813,335 B2 | 11/2004 | Shinbata | |
| 6,937,775 B2 | 8/2005 | Gindele et al. | |
| 7,015,929 B2 * | 3/2006 | Satomi et al. | 345/604 |
| 2001/0052971 A1 | 12/2001 | Tsuchiya et al. | |
| 2002/0158975 A1 | 10/2002 | Hiroshige et al. | |
| 2007/0109447 A1 | 5/2007 | Yamashita et al. | |
| 2008/0089601 A1 | 4/2008 | Ishiga | |
| 2008/0095431 A1 | 4/2008 | Ishiga | |
| 2008/0123999 A1 | 5/2008 | Ishiga | |
| 2009/0040386 A1 | 2/2009 | Ishiga | |
| 2009/0046943 A1 | 2/2009 | Ishiga | |

FOREIGN PATENT DOCUMENTS

| | | |
|---|---|---|
| JP | B2-2650759 | 9/1997 |
| JP | A-11-187420 | 7/1999 |
| JP | A-11-275363 | 10/1999 |

(Continued)

OTHER PUBLICATIONS

Tomasi et al.; "Bilateral Filtering for Gray and Color Images;" *Proceedings of the 1998 IEEE International Conference on Computer Vision*; 1998; Bombay, India.

*Primary Examiner* — Li Liu
(74) *Attorney, Agent, or Firm* — Oliff & Berridge, PLC

(57) ABSTRACT

An image processing method for removing a noise component contained in an original image includes: extracting a noise component contained in an original image in a work color space; creating a noise-free image in the work color space based upon the extracted noise component and a difference between gradation characteristics in the work color space and gradation characteristics in an output color space; converting the noise-free image in the work color space to an image in the output color space.

24 Claims, 10 Drawing Sheets

FOREIGN PATENT DOCUMENTS

| | | |
|---|---|---|
| JP | A-2001-167264 | 6/2001 |
| JP | A-2001-309177 | 11/2001 |
| JP | A-2005-312008 | 11/2005 |
| JP | B2-3809818 | 8/2006 |
| JP | A-2006-310999 | 11/2006 |
| WO | WO 2006/006373 A1 | 1/2006 |
| WO | WO 2006/064913 A1 | 6/2006 |
| WO | WO 2006/068025 A1 | 6/2006 |

\* cited by examiner

US 8,249,341 B2

IMAGE PROCESSING METHOD FOR REMOVING NOISE CONTAINED IN AN IMAGE

This application is a continuation of International Application No. PCT/JP2008/052747 filed Feb. 19, 2008.

INCORPORATION BY REFERENCE

The disclosures of the following priority application and International Application are herein incorporated by reference: Japanese Patent Application No. 2007-049114 filed Feb. 28, 2007; Japanese Patent Application No. 2007-049115 filed Feb. 28, 2007; and International Application No. PCT/JP2008/052747 filed Feb. 19, 2008.

BACKGROUND OF THE INVENTION

1. Field of the Invention

The present invention relates to an image processing method adopted to remove noise contained in an image.

2. Description of Related Art

Noise removal processing is executed in the related art by smoothing the target image in the final output space. However, since the noise fluctuation width usually changes depending upon the brightness level and the noise signal strength distribution is such that noise signals are mixed in with the brightness component in the final output color space, it can be extremely difficult to extract the noise component from image signals expressed with an aggregation of signals assuming various brightness levels by eliminating the influence of the various brightness levels. Some of the measures taken in the related art to address this issue, such as the adjustment of the noise removal filter coefficient or the filtering range of the noise removal filter in correspondence to the brightness level greatly complicate the processing (see patent reference 1). Other measures proposed in the related art include adjustment of the extent of noise removal in correspondence to the brightness level (see patent references 2, 3, 4 and 5).

There are methods having been proposed to address the issues discussed above more effectively, so as to achieve accurate noise removal while minimizing the inherent problems, by first projecting the target image into an image processing space optimal for noise removal and removing the noise from the image in the image processing space. For instance, patent reference 6 discloses a uniform noise space suitable for noise extraction and patent reference 7 proposes a uniform color uniform noise space achieved as an upgrade over the uniform noise space, which assures both accurate noise removal and effective prevention of the problems discussed above. It is to be noted that there are publications that, although not directly addressing the issues, disclose uniform color spaces optimized for human perception characteristics, each proposed to be used as an image processing space for noise removal (see patent reference 8 and non-patent reference 1).

Patent reference 1: Patent Publication No. 3809818
Patent reference 2: U.S. Pat. No. 5,051,842
Patent reference 3: U.S. Pat. No. 6,754,398
Patent reference 4: Patent Publication No. 3723043
Patent reference 5: Patent Publication No. 2650759
Patent reference 6: International Publication No. 2006/006373 pamphlet
Patent reference 7: International Publication No. 2006/064913 pamphlet
Patent reference 8: Japanese Laid Open Patent Publication No. H11-187420
Nonpatent reference 1: C. Tomasi et al., "Bilateral Filtering for Gray and Color Images" Proceedings of the 1998 IEEE International Conference on Computer Vision, Bombay, India

SUMMARY OF THE INVENTION

Under normal circumstances, noise removal is executed by trading off sharp definition for effective smoothing with regard to the luminance component and by trading off color fidelity for suppression of color mottling noise with regard to the chrominance components. Namely, no matter how high the performance level of the noise removal filter in use, it is very difficult to separate an edge structure from the noise component completely, resulting in problems attributable to the noise removal. The noise removal processing in the related art is executed as explained in an embodiment of any of the prior art technologies mentioned above tends to lower the contrast level in the edge structure, lower the saturation level or induce color loss in a color structure area, and cause a color overlay as the original image signal is smoothed and the effective dynamic range width in the gradation expression range becomes narrower, to converge toward the range corresponding to the average value. While the color overlay phenomenon occurs constantly in the middle range, it manifests as a particularly noticeable problem in a dark image area as the black level becomes lifted as a white area or manifests as a green-tinged overlay.

In particular, the edge and the actual noise in the noise component extracted with a noise removal filter through noise extraction processing executed in an output color space or a work color space that does not achieve uniform noise, cannot be separated from each other with precision and thus, the gravity of the challenges such as lowered contrast becomes more pronounced.

It is to be noted that while patent reference 5 discloses measures for solving the problems by lowering the overall noise removal intensity in a high contrast area, these measures lead to a secondary problem in that full noise removal cannot be achieved in a high contrast area.

According to the 1st aspect of the present invention, an image processing method for removing a noise component contained in an original image comprises: extracting a noise component contained in an original image in a work color space; creating a noise-free image in the work color space based upon the extracted noise component and a difference between gradation characteristics in the work color space and gradation characteristics in an output color space; converting the noise-free image in the work color space to an image in the output color space.

According to the 2nd aspect of the present invention, in the image processing method according to the 1st aspect, it is preferred that an extent of the difference between the gradation characteristics in the work color space and the gradation characteristics in the output color space changes in correspondence to a brightness level in the work color space.

According to the 3rd aspect of the present invention, in the image processing method according to the 1st aspect, it is preferred that: a contrast ratio function relative to a brightness level is set based upon the gradation characteristics of the image in the output color space and the gradation characteristics of the image in the work color space; and the noise-free image is created based upon the contrast ratio function having been set.

According to the 4th aspect of the present invention, in the image processing method according to the 1st aspect, it is preferred that the noise-free image is created based upon the extracted noise component and a difference between an extent of change in the gradation characteristics in the work color space and an extent of change in the gradation characteristics in the output color space.

According to the 5th aspect of the present inventions in the image processing method according to any one of the 1st through 4th aspects, it is preferred that a subtraction ratio at which the extracted noise component is subtracted from the original image is controlled based upon the difference between the gradation characteristics in the work color space and the gradation characteristics in the output color space.

According to the 6th aspect of the present invention, in the image processing method according to any one of the 1st through 4th aspects, it is preferred that the work color space is at least one of a uniform noise space, a uniform color space, and a uniform color·uniform noise space assuring both uniform color and uniform noise.

According to the 7th aspect of the present invention, in the image processing method according to the 1st or the 2nd aspect, it is preferred that the noise-free image is created based upon a differential ratio of image gradation characteristics assumed in the output color space and image gradation characteristics assumed in the work color space.

According to the 5th aspect of the present invention, in the image processing method according to any one of the 1st through 4th aspects, it is preferred that an extent of noise removal is set to a large value in advance for a gradation area where the noise component is bound to be amplified through gradation conversion to the output color space and the extent of noise removal is set to a small value in advance for a gradation area where the noise component is bound to be attenuated through the gradation conversion to the output color space.

According to the 9th aspect of the present invention, in the image processing method according to any one of the 1st through 4th aspects, it is preferred that the original image is converted to an image in the work color space assuming gradation characteristics varying in correspondence to imaging sensitivity with which the original image has been captured.

According to the 10th aspect of the present invention, in the image processing method according to any one of the 1st through 4th aspects, it is preferred that the output color space assumes gradation characteristics of a standard RGB color space.

According to the 11th aspect of the present invention, in the image processing method according to any one of the 1st through 4th aspects, it is preferred that in case that gradation correction processing is executed in addition to processing for removing the noise component contained in the original image and gradation characteristics of an image held in an input color space are different from the gradation characteristics of the image held in the output color space, the noise-free image is created based upon a difference between the gradation characteristics of the image in the output color space having undergone the gradation correction processing and the gradation characteristics of the image in the work color space.

According to the 12th aspect of the present invention, in the image processing method according to any one of the 1st through 4th aspects, it is preferred that the original image is converted to an image in the work color space expressed with a luminance component and chrominance components and the noise-free image is created in correspondence to each color component.

According to the 13th aspect of the present invention, in the image processing method according to any one of the 1st through 4th aspects, it is preferred that the original image is converted to an image in the work color space expressed with a luminance component and chrominance components and the noise-free image is created in correspondence to at least one color component.

According to the 14th aspect of the present invention, in the image processing method according to the 3rd aspect, it is preferred that the noise-free image is created based upon the contrast ratio function and a brightness level at each local area in the image.

According to the 15th aspect of the present invention, in the image processing method according to the 3rd aspect, it is preferred that the noise-free image is created based upon the contrast ratio function and an edge intensity level at each local area in the image.

According to the 16th aspect of the present invention, in the image processing method according to the 3rd aspect, it is preferred that: the original image is converted to an image in the work color space expressed with a luminance component and chrominance components; and the noise-free image for the luminance component is created by setting a contrast ratio function standardized based upon a differential ratio assumed at an exposure reference point with regard to the brightness level in the work color space.

According to the 17th aspect of the present invention, in the image processing method according to the 3rd aspect, it is preferred that: the original image is converted to an image in the work color space expressed with a luminance component and chrominance components; and the noise-free image for one of the chrominance components is created by setting a contrast ratio function standardized based upon a differential ratio assumed at a saturation reference point with regard to the brightness level in the work color space.

According to the 18th aspect of the present invention, an image processing method for removing a noise component contained in an original image comprises: converting an original image to an image in a work color space assuming specific gradation characteristics; creating a noise-free image by removing noise in the original image in the work color space; and converting the noise-free image in the work color space to an image in an output color space assuming gradation characteristics different from the gradation characteristics in the work color space, and the noise-free image is created by setting smoothing intensity for the original image based upon a difference between the gradation characteristics in the work color space and the gradation characteristics in the output color space.

According to the 19th aspect of the present invention, in the image processing method according to the 18th aspect, it is preferred that the smoothing intensity in the work color space is set so that smoothing intensity for the noise-free image following conversion to the output color space is homogenized over individual gradations assumed in image signals of the original image.

According to the 20th aspect, in the image processing method according to the 18th aspect, it is preferred that a contrast ratio determined based upon the difference between the gradation characteristics in the work color space and the gradation characteristics in the output color space is reflected in the smoothing intensity to an extent corresponding to a brightness level in the original image.

According to the 21st aspect of the present invention, in the image processing method according to the 18th aspect, it is preferred that the smoothing intensity is controlled by adjusting a mixing ratio for a smoothed image having been smoothed through specific smoothing processing and the original image or by adjusting a subtraction ratio at which a noise component having been extracted based upon a difference between the original image and the smoothed image is subtracted from the original image.

According to the 22nd aspect of the present invention, an image processing method for removing a noise component contained in an original image comprises: detecting an edge in an original image; and executing noise removal processing with varying smoothing intensity levels in correspondence to brightness over an area where intensity of the detected edge is relatively high According to the 23rd aspect of the present invention, an image processing method for removing a noise component contained in an original image comprises: extracting an edge component contained in an original image; increasing an extent of adjustment of smoothing intensity relative to brightness as intensity of the extracted component increases; and creating a noise-free image based upon the smoothing intensity.

According to the 24th aspect of the present invention, in the image processing method according to the 23rd aspect, it is preferred that when creating the noise-free image, the smoothing intensity is increased at a position at which gradation characteristics corresponding to the brightness of the original image, indicate higher contrast relative to predetermined gradation characteristics, and the smoothing intensity is lowered at a position at which the gradation characteristics indicate lower contrast, over an area where the edge component intensity is relatively high According to the 25th aspect of the present invention, in the image processing method according to the 23rd aspect, it is preferred that as the edge component intensity decreases, the extent of adjustment of the smoothing intensity relative to the brightness is decreased so as to set a more constant smoothing intensity.

According to the 26th aspect of the present invention, in the image processing method according to any one of the 22nd through 25th aspects, it is preferred that the edge intensity is measured by comparing the edge intensity with a predetermined value indicating an absolute edge intensity level corresponding to an achievable gradation range.

According to the 27th aspect of the present invention, in the image processing method according to the 23rd aspect, it is preferred that: noise removal is executed in a work color space assuming specific gradation characteristics and the noise-free image is created by converting a target image to an image in an output color space assuming gradation characteristics different from the gradation characteristics in the work color space; and the smoothing intensity is set based upon a difference between the gradation characteristics in the work color space and the gradation characteristics in the output color space.

According to the 28th aspect of the present invention, in the image processing method according to the 27th aspect, it is preferred that the smoothing intensity relative to the brightness, which is set based upon the difference in the gradation characteristics, is selected through a function that monotonously increases relative to the intensity of the edge component.

According to the 29th aspect of the present invention, in the image processing method according to the 23rd aspect, it is preferred that the smoothing intensity corresponding to the brightness level in the image is set to a lower level over a higher brightness range relative to a medium brightness level.

According to the 30th aspect of the present invention, in the image processing method according to the 29th aspect, it is preferred that the smoothing intensity corresponding to the brightness level in the image is set to a lower level over a lower brightness range relative to a medium brightness level.

According to the 31st aspect of the present invention, an image processing method for removing a noise component contained in an original image comprises: creating a noise-free image through noise removal executed on an original image in a work color space assuming specific gradation characteristics; and creating an output noise-free image by converting the noise-free image to an image in an output color space assuming gradation characteristics different from the gradation characteristics in the work color space, and: an edge component is detected in the original image; smoothing intensity for image signals present near the detected edge component is set based upon a difference between the gradation characteristics in the work color space and the gradation characteristics in the output color space; and the noise-free image is created based upon the smoothing intensity having been set.

According to the 32nd aspect of the present invention, in the image processing method according to the 31st aspect, it is preferred that the smoothing intensity in the work color space is set so that smoothing intensity for the noise-free image following conversion to the output color space is homogenized over individual gradation levels of image signals present near the detected edge.

According to the 33rd aspect of the present invention, in the image processing method according to the 31st aspect, it is preferred that a contrast determined based upon the difference between the gradation characteristics in the work color space and the gradation characteristics in the output color space is reflected in the smoothing intensity to an extent corresponding to the intensity of the detected edge component.

According to the 34th aspect of the present invention, in the image processing method according to the 33rd aspect, it is preferred that the edge intensity is measured by comparing the edge intensity with a predetermined value indicating an absolute edge intensity level corresponding to an achievable gradation range.

According to the 35th aspect of the present invention, in the image processing method according to the 23rd or the 31st aspect, it is preferred that the smoothing intensity is controlled by adjusting a mixing ratio for a smoothed image having been smoothed through specific smoothing processing and the original image or by adjusting a subtraction ratio at which a noise component having been extracted based upon a difference between the original image and the smoothed image is subtracted from the original image.

According to the 36th aspect of the present invention, in the image processing method according to the 23rd or the 31st aspect, it is preferred that the original image is an image each of color components separated as a luminance component and chrominance components.

According to the 37th aspect of the present invention, in the image processing method according to the 27th or the 31st aspect, it is preferred that the work color space is at least one of a uniform noise space, a uniform color space, and a uniform color·uniform noise space assuring both uniform color and uniform noise.

According to the 38th aspect of the present invention, an image processing method for removing a noise component contained in an original image comprises: converting an original image to an image in a work color space assuming specific gradation characteristics; extracting a noise component contained in the original image in the work color space; creating a noise-free image based upon the extracted noise component; converting the noise-free image in the work color space to an image in an output color space assuming gradation characteristics different from the gradation characteristics in the work color space; determining a difference between the gradation characteristics in the work color space and the gradation characteristics in the output color space in correspondence to each local area in the original image; and creating the noise-free image based upon the difference between the gradation characteristics in the work color space and the gradation characteristics in the output color space determined in correspondence to each local area in the original image and the extracted noise component.

According to the 39th aspect of the present invention, a computer-readable computer program product contains an image processing program enabling a computer or an image processing apparatus to execute an image processing method according to anyone of the 1st through the 38th aspects.

According to the 40th aspect of the present invention, an image processing apparatus comprises a control device that executes an image processing method according to the 1st through the 38th aspects.

According to the 41st aspect of the present invention, an electronic camera comprises a control device that executes an image processing method according to the 1st through the 38th aspects.

DESCRIPTION OF PREFERRED EMBODIMENTS

Standard gradation correction technologies include; 1) the gamma contrast emphasis method (also referred to as histogram equalization) whereby the gamma gradation characteristics of the entire image are adjusted in correspondence to the luminance distribution in the input image and 2) the retinex contrast emphasis method whereby local gamma gradation characteristics are modified in correspondence to the local lightness distribution. In reference to the following embodiments, specific models of new noise removal technologies assuring a high level of textural richness fidelity with advantages similar to those of these contrast emphasis methods realized within the framework of noise removal technologies are described. In other words, the present invention provides a technology equivalent to the contrast correction technologies modified for optimal adoption in noise removal.

However, it would be more accurate to equate the technology provided by the present invention with a preventive technology for preventing loss of the initial contrast in the original image as the image is smoothed for noise removal rather than a technology specifically intended for emphasizing the contrast. It is essential in the pursuit of maximum textural richness fidelity to be achieved within the framework of a noise removal technology that fully developed noise removal performance be assured so as to allow the noise and the edge to be separated from each other with a high level of precision Examples in which the separation accuracy is improved by adopting the multiresolution representation technology having gained significant ground in recent years are described first and then an example in which the present invention is adopted in noise removal processing executed in the real space, which is the norm today, is described. In addition, a color space assuring a high level of separation accuracy is used as the work color space.

First Embodiment

In reference to the first embodiment, an example in which the gamma contrast correction technology is adopted in noise removal executed based upon multiresolution representation is described.

Figure 1:
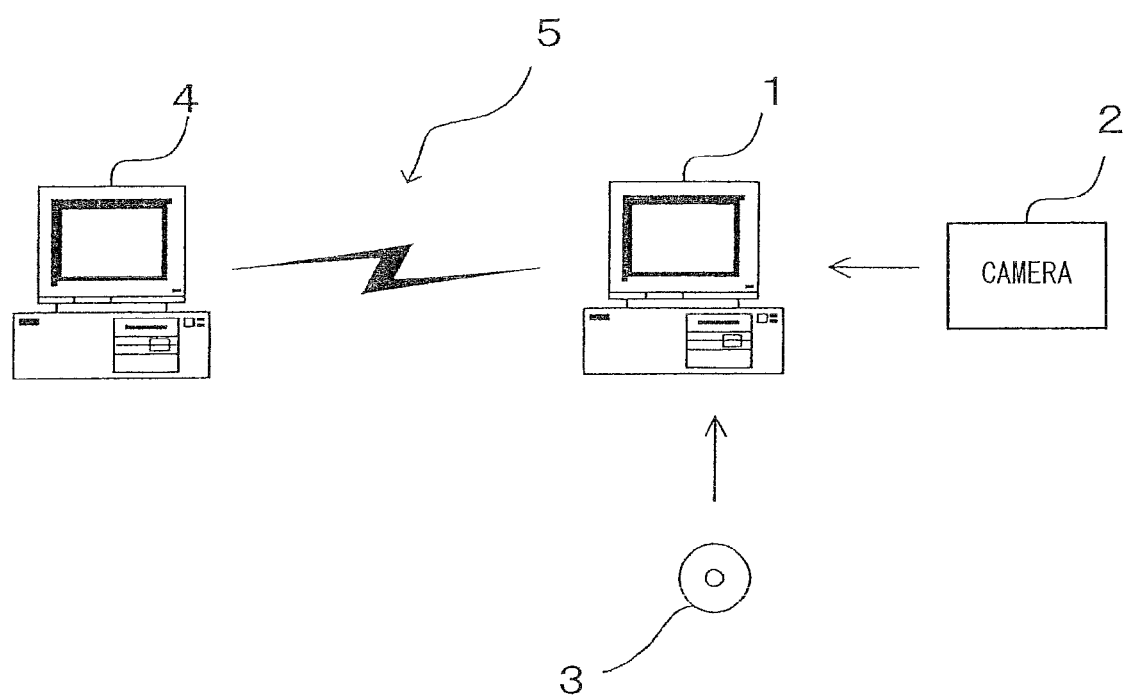
FIG. 1 shows an image processing apparatus achieved in an embodiment of the present invention.

FIG. 1 shows the image processing apparatus achieved in an embodiment of the present invention. The image processing apparatus is constituted with a personal computer 1. The personal computer 1, which is connected with a digital camera 2, a recording medium 3 such as a D-ROM, another computer 4 and the like, is able to receive various types of image data. The personal computer 1 executes the image processing to be explained below on the image data provided thereto. The personal computer 1 is connected to the computer 4 via an electronic communication network 5, which may be the Internet.

Figure 8:
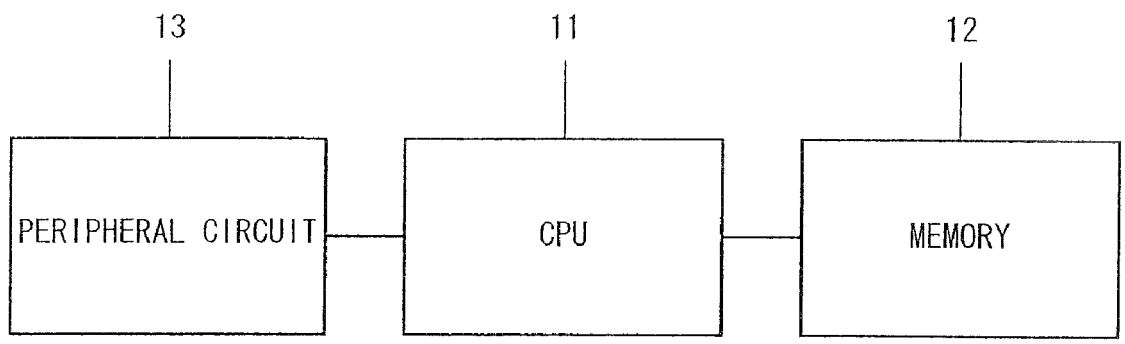
FIG. 8 shows the structure of the personal computer.

The program that enables the computer 1 to execute the image processing is provided in a recording medium such as a CD-ROM or by another computer via the Internet or another electronic communication network connected to the personal computer in a manner similar to that shown in FIG. 1, and the program thus provided is installed within the personal computer 1. FIG. 8 shows the structure of the personal computer 1. The personal computer 1 comprises a CPU 11, a memory 12, peripheral circuits 13 and the like. The installed program is executed by the CPU 11.

The program to be provided via the Internet or another electronic communication network is converted to and transmitted as a signal on a carrier wave which is carried through the electronic communication network, i.e., a transmission medium. Namely, the program can be distributed as a computer-readable computer program product adopting any of various modes including a recording medium and a carrier wave.

Figure 2:
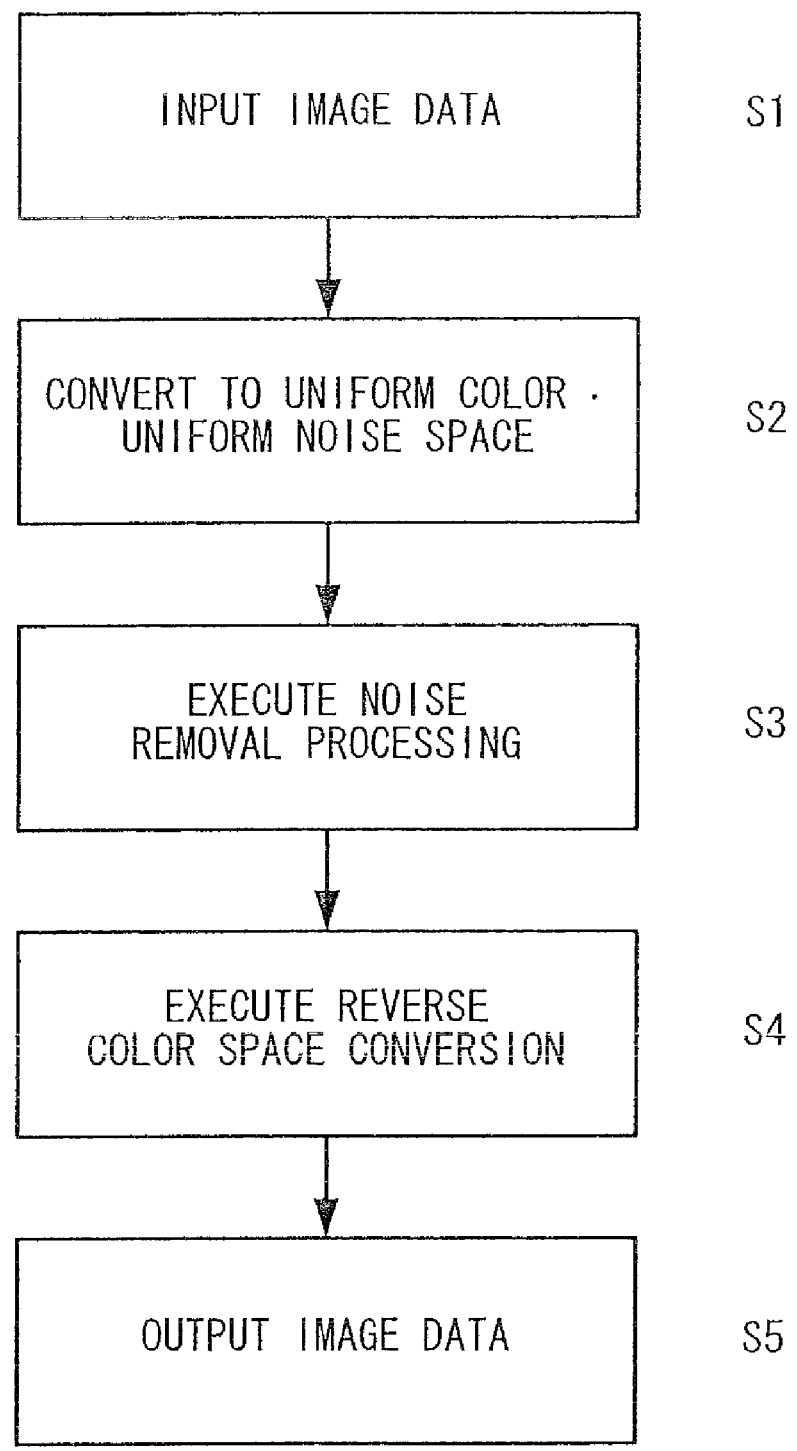
FIG. 2 presents a flowchart of the image processing executed by the personal computer 1 in a first embodiment.

The following is a description of the image processing executed in the personal computer 1. FIG. 2 presents a flowchart of the image processing executed by the personal computer 1 in the first embodiment. In step S1, image data are input. In step S2, the image data are converted to data in a uniform color·uniform noise space. In step S3, noise removal processing is executed. In step S4, color space reverse conversion is executed. In step S5, the image data resulting from the processing are output. The processing executed in the individual steps is now described in detail.

1 Color Space Conversion

After the image data (hereafter referred to as an image) are input in step S1, the input image undergoes color space conversion and thus is projected into an image processing space optimal for the noise removal processing in step S2. Such an image processing space may be, for instance, the uniform color·uniform noise space disclosed in International Publication No. 2006/064913 pamphlet (proposed by the inventor of the present invention; see patent reference 7 listed in the related art). The use of the uniform color·uniform noise space is advantageous in that the separation accuracy with which the edge component and the noise component in the image structure are separated from each other through noise removal processing is improved. The input image is usually expressed in a standard color space such as the sRGB color space. Accordingly, the following explanation is provided by assuming that the input image is an sRGB image having undergone color correction processing, gamma correction processing and the like.

1-1 Reverse Gamma Correction

The gradation conversion, having been executed to achieve gamma characteristics conforming to the sRGB specifications or the unique gamma characteristics assumed by the camera manufacturer in conjunction with its proprietary image creation technology, is undone so as to convert the data back to the initial linear gradation data. The sRGB image is converted back to the initial linear gradation data through reverse gamma correction as expressed below. If the manufacturer-inherent gamma characteristics cannot be ascertained, reverse conversion for gamma characteristics conforming to the sRGB specifications may substitute for $\gamma^{-1}$.

$$R_{sRGB}^{linear} = \gamma^{-1}(R_{sRGB})$$ [Expression 1]

$$G_{sRGB}^{linear} = \gamma^{-1}(G_{sRGB})$$

$$B_{sRGB}^{linear} = \gamma^{-1}(B_{sRGB})$$

1-2 Conversion From RGB Color Space to XYZ Color Space

Next, the RGB color space data having been converted back to the linear gradation data are converted to data in the XYZ color space. This conversion is executed through a specific 3×3 matrix conversion, which is determined in correspondence to the spectral characteristics of the RGB reference color stimuli. For instance, the sRGB input image having been converted back to linear gradation data may undergo the following standard conversion.

$$\begin{pmatrix} X \\ Y \\ Z \end{pmatrix} = \begin{pmatrix} 0.4124 & 0.3576 & 0.1805 \\ 0.2126 & 0.7152 & 0.0722 \\ 0.0193 & 0.1192 & 0.9505 \end{pmatrix} \begin{pmatrix} R_{sRGB}^{linear} \\ G_{sRGB}^{linear} \\ B_{sRGB}^{linear} \end{pmatrix}$$ [Expression 2]

1-3 Conversion from XYZ Color Space to Uniform Color·Uniform Noise Color Space (L^a^b^)

Next, the data in the XYZ space are converted to a nonlinear gradation L^a^b^ space representing a perceptive attribute with a pseudo-uniform color distribution. The L^a^b^ space is defined in the description of the embodiment as a space obtained by modifying the uniform color space L*a*b* in the related art in consideration of uniform noise and, for the sake of convenience, is referred to as L^a^b^.

$$\hat{L} = 100 \cdot f\left(\frac{Y}{Y_0}\right)$$ [Expression 3]

$$\hat{a} = 500\left\{f\left(\frac{X}{X_0}\right) - f\left(\frac{Y}{Y_0}\right)\right\}$$

$$\hat{b} = 200\left\{f\left(\frac{Y}{Y_0}\right) - f\left(\frac{Z}{Z_0}\right)\right\}$$

The gradation characteristics used to achieve uniform color·uniform noise in this process are usually expressed as;

$$f(t) = \frac{\sqrt{t+\varepsilon} - \sqrt{\varepsilon}}{\sqrt{1+\varepsilon} - \sqrt{\varepsilon}}$$ [Expression 4]

It is to be noted that $0 \le t \le 1$. However, the expression above may be modified as expressed below by applying a positive offset value to the ⅓ power gamma characteristics of the CIE-compliant L*a*b* space, so as to achieve gradation characteristics with uniform noise.

$$f(t) = \frac{\sqrt[3]{t+\varepsilon} - \sqrt[3]{\varepsilon}}{\sqrt[3]{1+\varepsilon} - \sqrt[3]{\varepsilon}}$$ [Expression 5]

X0, Y0 and Z0 in the expressions above each represent a value determined in correspondence to the illuminating light. For instance, X0, Y0 and Z0 may assume values 95.045, 100.00 and 108.892 respectively in a 2° visual field under standard light D65. While ε assumes a value dependent upon the specific sensor in use, a value very close to zero, for instance, will be assumed when a low sensitivity setting is selected and a value approximately equal to 0.05 will be assumed when a high sensitivity setting is selected.

2 Multiresolution Image Representation

Figure 3A:
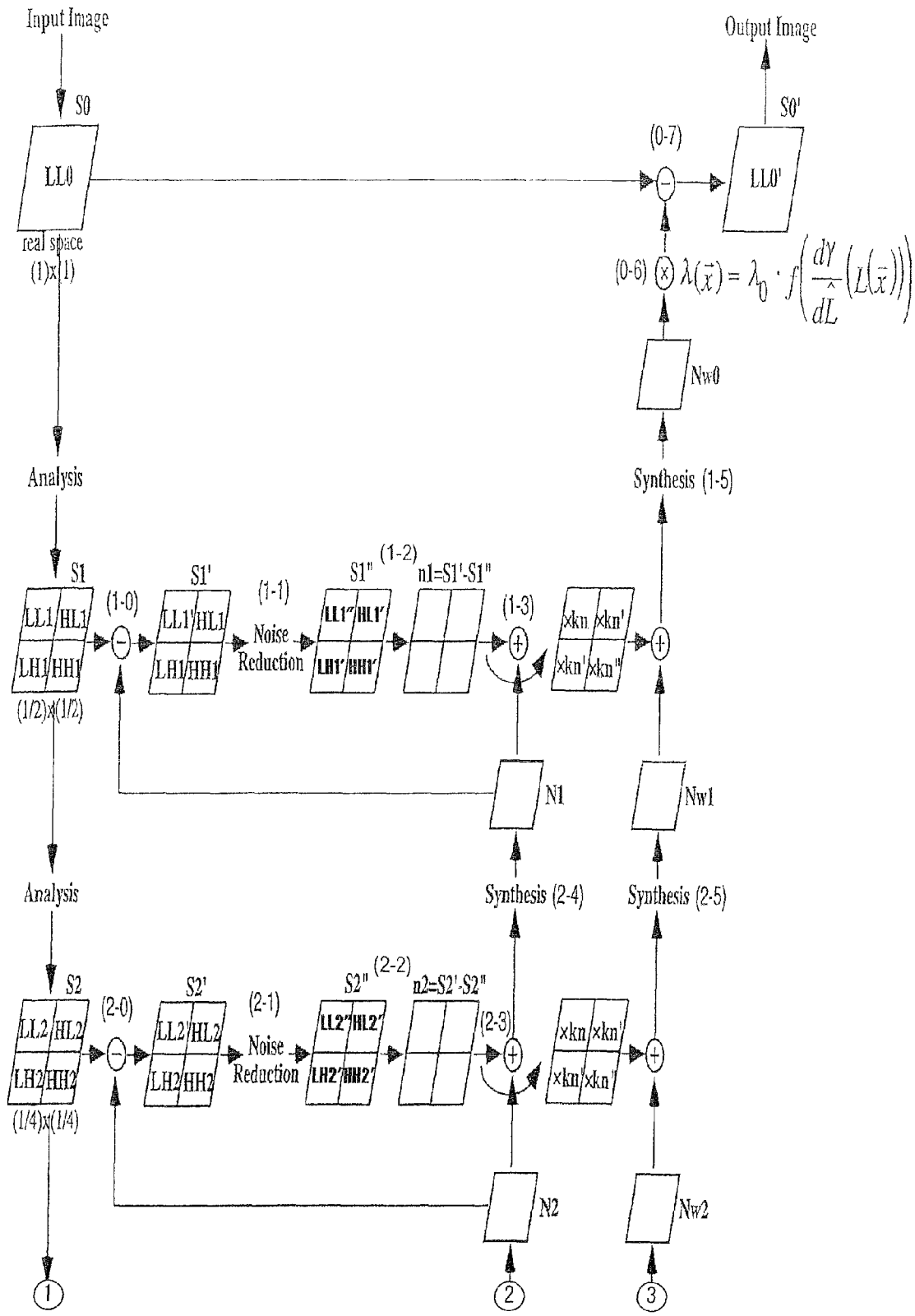
FIGS. 3A-3B present a flowchart of the noise removal processing executed based upon multiresolution representation in the first embodiment.
Figure 3B:
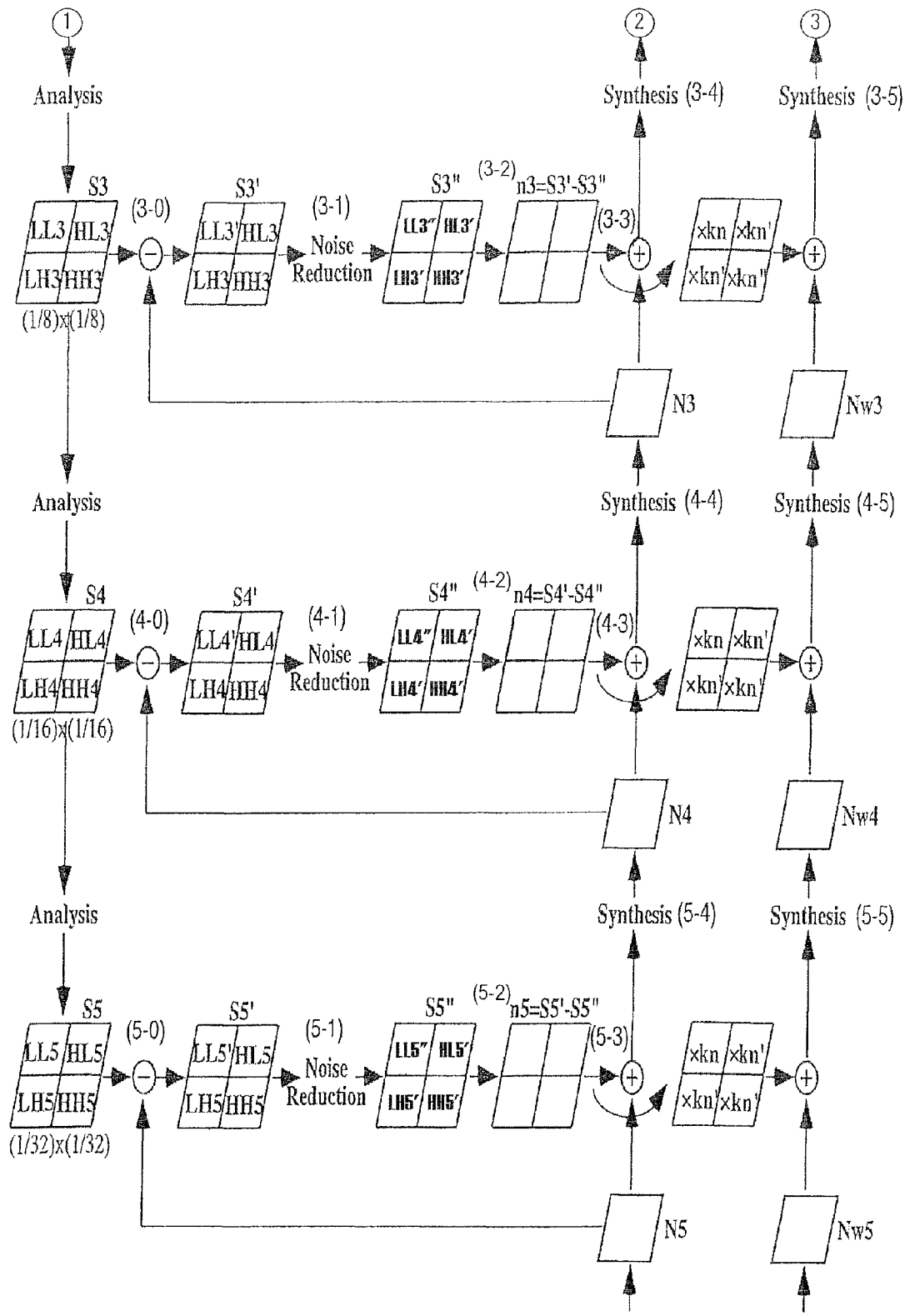

Next, the noise removal processing executed in step S3 is explained. FIGS. 3A-3B present a flowchart of the noise removal processing executed based upon multiresolution image representations in the embodiment. Namely, the original images corresponding to the luminance component L^, the chrominance components a^ and b^ resulting from the data conversion to the uniform color·uniform noise color space described above are rendered in multiple resolution levels and then they individually undergo noise removal independently of one another. The analysis phase of sequential wavelet transformation, through which subband images are generated by decomposing each original image into lower resolution images, is summarized in the expression below.

$$V_{ij}(\vec{x}) = Wavelet_{(i,j)}\{S(\vec{x})\},$$ [Expression 6]

$i = 1, 2, \ldots, 5(\text{resolution})$ $j = LL, LH, HL, HH$

It is to be noted that a subband image Vij(x, y) is generated for S(x, y) in correspondence to each of the L^a^b^ planes.

It is also to be noted that in the wavelet transformation, through which an image (image data) is converted to frequency component data, the frequency component in the image is divided into a high-pass component and a low-pass component. Data made up of the high-pass component referred to as a high-frequency subband, whereas data made up of the low-pass component are referred to as a low-frequency subband. The LL component data are low-frequency subband data, whereas the LH, HL and HH data are high-frequency subband data. Also, a low-frequency subband may be referred to as a low-frequency image and a high-frequency subband may be referred to as a high-frequency image. Furthermore, each subband may be referred to as a frequency band-limited image. A low-frequency subband is an image with band limits imposed upon the frequency band of the original image toward the low-frequency side, whereas a high-frequency subband is an image with band limits imposed upon the frequency band of the original image toward the high-frequency side.

While only the high-frequency subbands, obtained by sequentially decomposing the low-frequency subband LL component, are simply retained in the standard multiresolution transformation, the embodiment adopts multiple resolution levels whereby both the low-frequency subband LL and the high-frequency subbands LH, HL and HH are retained, so as to ensure that the noise component is always extracted from one subband frequency range to another.

The wavelet transformation may be executed by using, for instance, the 5/3 filter described below.
(Wavelet Transformation: Analysis/Decomposition Process)

high-pass component: $d[n]=x[2n+1]-(x[2n+2]+x[2n])/2$ low-pass component: $s[n]=x[2n]+(d[n]+d[n-1])/4$ The one-dimensional wavelet transformation defined as described above is executed along the horizontal direction and the vertical direction independently through two-dimensional separation filtering processing so as to achieve wavelet decomposition. The coefficient s is directed onto the L plane, whereas the coefficient d is directed onto the H plane.
(Inverse Wavelet Transformation: Synthesis/Reconstruction Process)

$x[2n]=s[n]-(d[n]+d[n-1])/4$ $x[2n-1]=d[n]+(x[2n+2]+x[2n])/2$

It is to be noted that a signal expressing the image is input to be used as the x value in the wavelet transformation, that the noise component contained in the wavelet transformation coefficients s and d having been generated is extracted and that the values of the extracted noise component are set as s and d for substitution in the inverse wavelet transformation so as to generate a noise image x, as shown in FIGS. 3A-3B.

While the multiple resolution levels are achieved through the five-stage wavelet transformation in the example described above, the number of stages over which the wavelet transformation is executed may be adjusted in correspondence to the size of the initial input image. In addition, instead of the (bilateral) orthogonal wavelet transformation described above, Laplacian pyramid representation, steerable pyramid representation or the like may be adopted to achieve the multiple resolution levels.

3 Noise Extraction Processing Through Virtual Noise Removal
3-1 Noise Extraction Processing With Noise Removal Filter
3-1-1 Noise Removal Processing First, virtual noise removal is executed at each resolution. The term "virtual noise removal" refers to the noise removal executed on a temporary basis prior to the ultimate noise removal executed to remove noise from the original image. While the virtual noise removal may be executed on the individual subbands at each resolution by using any noise removal filter, the following explanation focuses on a modified bilateral filter such as that expressed below, disclosed in International Publication No. 2006/06825 pamphlet (disclosed by the inventor of the present invention) and achieved by modifying a high-performance bilateral filter. Since a noise removal filter normally distinguishes the edge component from the noise component by comparing it with an expected noise fluctuation width $\sigma_{th}$, the use of an all-purpose noise removal filter in a uniform noise space achieving uniform noise over the full gradation range is bound to contribute to a significant improvement in the separation performance. Such an improvement in the separation performance may be achieved through the use of a $\sigma$ filter or a $\epsilon$ filter, as well as the modified bilateral filter described in reference to the embodiment.

Since the image signal V(x, y) has shifted into a space that assures uniform noise relative to the brightness through the non-linear gradation conversion executed in step S2 in FIG. 2, the filter simply must be set so as to compare the signal with a noise index value unaffected by the brightness level. Under such circumstances, the noise removal filter provides a highest level of performance through simple operation. It is to be noted that while the (vector(→)x) used in the expression is equivalent to (x, y) in a two-dimensional image. Accordingly, the notation (x, y) is used in the main text to refer to (vector (→)x) due to limited availability of certain symbols.

$$V'(\vec{x}) = \frac{\int_{|\vec{x}'-\vec{x}|\leq 2r_{th}} V(\vec{x}')\exp\left(-\frac{|V(\vec{x}')-V(\vec{x})|^2}{\sigma_{th}^2} \cdot \frac{|\vec{x}'-\vec{x}|^2}{r_{th}^2}\right)d\vec{x}'}{\int_{|\vec{x}'-\vec{x}|\leq 2r_{th}} \exp\left(-\frac{|V(\vec{x}')-V(\vec{x})|^2}{\sigma_{th}^2} \cdot \frac{|\vec{x}'-\vec{x}|^2}{r_{th}^2}\right)d\vec{x}'}$$ [Expression 7]

For purposes of simplification, the expression above does not include the subband identifying symbols i and j The threshold value $\sigma_{th}$ is set in correspondence to the expected noise fluctuation width (noise fluctuation index value) in each subband and the noise component is extracted by distinguishing noise from edges. $\sigma_{th}$ is set so as to assume a greater value as the ISO sensitivity rises. For instance, $\sigma_{th}$ may be set to a value of approximately 10 in correspondence to 256 gradation levels at ISO 6400. Accordingly, noise fluctuation occurs to an extent of approximately ±10 over the full gradation range of data achieving uniform noise and S/N=256/10 even at the lightest saturation level.

The threshold value rth should assume a value in a range of, for instance, 0.5~3.0 pixels so as to ensure that the ranges of the noise removal filters at different resolution levels overlap. In addition, the integrating range should be set so that the range is equivalent to double or triple the rth value in order to ensure that the coefficient assumes a small enough value. A satisfactory level of noise removal effect can be normally achieved with another type of noise removal filter, as long as it executes filtering processing on subband images expressed through multiple resolution levels by referencing pixel signals within a pixel range of 3×3~9×9.

It is to be noted that the modified bilateral filter is a non-separation weighting-type bilateral filter, which differs from the standard bilateral filter in that the weighting coefficient cannot be separated into a photometric term and a geometric term. This means that the modified bilateral filter assumes a weighting coefficient represented by a single exponential function with a value represented by the product of two arguments set as an exponent thereof.

3-1-2 Noise Extraction Processing

Noise extraction processing is executed for each subband as expressed below.

$$n_{ij}(\vec{x}) = V_{ij}(\vec{x}) - V'_{ij}(\vec{x}) \quad \text{[Expression 8]}$$

3-2 Sequential Noise Extraction

It is difficult to extract the entire noise component seamlessly through noise removal filtering executed on each subband plane. Accordingly, noise is extracted sequentially by referencing the noise having been extracted at another resolution level so as to ensure that there will be no gap between the frequency bands separated from one another due to multiresolution decomposition in the embodiment.

While the sequential noise removal may be executed either during the analysis phase or during the synthesis phase, the noise removal filtering operation mentioned earlier is executed in the first embodiment upon facilitating the extraction of the noise component from the LL plane by executing virtual noise synthesis for purposes of complete noise component extraction and subtracting the synthesized noise component generated at each hierarchical layer from the corresponding LL subband plane. In other words, sequential noise removal is executed during the synthesis phase in the embodiment.

An explanation is now given on the processing executed on image signals S2 (LL2, LH2, HL2, HH2) at ¼ resolution level, generated by executing wavelet transformation on an image signal S0 (LL0) on the real space plane twice. First, the synthesized noise component (N2) having been generated through noise synthesis executed for the ⅛ resolution hierarchical layer, i.e., the hierarchical layer immediately below the ¼ resolution hierarchical layer, is subtracted from the subband LL2, thereby creating a condition LL2' in which the noise component can be extracted with ease from LL2 (processing (2-0)). Subsequently, the noise removal filtering operation explained earlier is executed on each subband (LL2', HL2, LH2, HH2) (processing (2-1)).

Subsequently, a noise component n2 is extracted (processing (2-2)) by subtracting the image signals S2'' (subbands LL2'', HL2', LH2', HH2') having undergone the noise removal filtering operation from the image signals S2' (subbands LL2', HL2, LH2, HH2) in the pre-noise removal filtering operation state. The noise component at the LL plane in the extracted noise component n2 is added to the noise component (N2) generated through noise synthesis at the lower hierarchical layer (processing (2-3)), noise synthesis is executed through inverse wavelet transformation by using a sum representing the LL plane noise component and the extracted noise component signals corresponding to the other planes, i.e., the LH, HL and HH planes, thereby generating an synthesized noise component (N1) (processing (2-4)). The processing described above is executed at the individual hierarchical layers to achieve a virtual noise synthesis. Namely, the virtual noise synthesis is expressed as follows.

$$N(\vec{x}) = \sum_{\substack{i=LL,LH,HL,HH \\ j=1,2,\ldots,5}} \text{Wavelet}^{-1}\{n_{ij}(\vec{x})\} \quad \text{[Expression 9]}$$

The processing executed in the embodiment differs from the multiresolution decomposition in the related art executed by using high-frequency subbands alone, in that since noise is extracted and synthesized with low-frequency subbands, too, retained at the individual hierarchical layer planes. In other words, the expression presented above indicates that processing whereby the two layers of the noise component at the LL band, i.e., the synthesized noise component at the resolution level corresponding to the lower layer, generated through the inverse wavelet transformation, and the noise component extracted with the noise removal filter, are added together, and the noise component sum representing an integrated layer undergoes the inverse wavelet transformation, is executed repeatedly in sequence.

While FIGS. 3A-3B clearly indicate the processing details, the processing in FIGS. 3A-3B is equivalent to repeatedly executing processing whereby arithmetic processing expressed as $$N_M(\vec{x}) = \sum_{\substack{i=LL,LH,HL,HH \\ j=5,4,\ldots,M+1}} \text{Wavelet}^{-1}\{n_{ij}(\vec{x})\} \quad \text{[Expression 10]}$$

$$V'_{LL,j}(\vec{x}) = V_{LL,j}(\vec{x}) - N_j(\vec{x})$$

is followed by the processing explained in 3-1-1 and 3-1-2. When M=5, the noise component synthesis is executed with noise actually not extracted and thus, N5(x, y)=0.

4 Actual Noise Synthesis

After the entire noise component in each subband has been extracted, the noise component signals are synthesized by applying optimal weights, each corresponding to a specific frequency band, so as to assure the highest possible noise removal effect while minimizing damage to the actual image (processing (1-5) (2-5) (3-5) (4-5)). When the noise is hypothetically assumed to be white noise, weights are applied invariably at the ratio of 1:1 for the individual resolution hierarchical layers and the high-frequency subbands HH, HL and LH are mainly weighted relative to the low-frequency subband LL.

The optimal weights to be applied in this process vary depending upon the nature of the original image. In conjunction with the luminance image plane, which contains a great deal of high-frequency information, great weight should be applied to the high-frequency subbands, whereas a somewhat significant weight should be applied to the low-frequency subband in conjunction with a chrominance image plane containing a great deal of low-frequency information. Namely, the weight application is equivalent to adjusting the frequency projection space used in the noise extraction processing to a frequency space where accurate noise removal and desirable image structure preservation can both be assured, in correspondence to the nature of the original image. It is to be noted that Nw5(x, y)=0 for Nw5 (see FIG. 3B) at the 1/32 resolution level, since the noise component signals are synthesized with noise not extracted.

$$N_w(\vec{x}) = \sum_{\substack{i=LL,LH,HL,HH \\ j=1,2,\ldots,5}} \text{Wavelet}^{-1}\{k_{nij} \cdot n'_{ij}(\vec{x})\} \quad \text{[Expression 11]}$$

The expression above indicates that the inverse wavelet transformation is executed for the LL component by first adding the two layers of noise components, i.e., the noise component obtained through the synthesis of the noise component signals at the resolution levels corresponding to the lower layers and the noise component extracted with a noise removal filter so as to generate the noise component sum representing a single layer.

5 Generation of Virtual Noise-Free Luminance Plane

In order to obtain a noise-free reference luminance plane to be used in the subsequent processing, i.e., "6 Actual noise removal processing", a temporary virtual noise-free luminance plane is generated by using 100% of the noise component resulting from the actual noise synthesis. While this processing is not shown in FIGS. 3A-3B, it is equivalent to generating a virtual noise-free luminance plane through processing (0-7) without executing processing (0-6) in FIG. 3R The virtual noise-free luminance plane thus generated is then used in the processing (0-6) described below.

$$\tilde{\hat{L}}(\vec{x}) = \hat{L}(\vec{x}) - N_w(\vec{x})$$ [Expression 12]

However, this processing may be skipped under certain circumstances and, in such case, the luminance plane L^(x, y) of the original image that has not undergone noise removal may be used in place of the virtual noise-free luminance plane.

6 Actual Noise Removal Processing

The synthesized noise component Nw0 undergoes the processing described below (processing (0-6)) and then the actual noise removal is executed (processing (0-7)) by actually subtracting the noise component from the original image S0.

The synthesized noise component Nw0 resulting from the actual noise synthesis has been extracted by taking various measures to improve the edge/noise separation accuracy, e.g., by projecting the target image into the image processing color space compatible with the noise removal filter, by raising the performance level of the noise removal filter and projecting the image into the optimal noise removal frequency space. However, even after these measures are taken, the synthesized noise component will still contain a crucial edge component indispensable for textural richness reproduction.

Accordingly, the lowered contrast likely to manifest as a detrimental outcome of the edge component subtraction is estimated in advance and measures for minimizing the extent of contrast reduction are taken in the embodiment. Namely, the gradation characteristics of the work color space where the image undergoes the image processing are different from the gradation characteristics of the output color space into which the image data having undergone noise removal are converted and the measures devised in the embodiment are intended to eliminate the risk of the edge contrast over an edge area having already been lowered through the noise removal, becoming even lower or the risk of the residual noise component becoming amplified as is likely to occur during the gradation conversion.

The risks may be eliminated by, for instance, lowering the noise removal rate over any area where the edge contrast is likely to be lowered under fine control executed in units of the individual pixels and raising the noise removal rate over an area where the noise is likely to become amplified also under fine control executed in units of the individual pixels. In other words, the likelihood of the noise component to be used in the final processing manifesting a noise leak or containing impurity is predicted and the noise removal rate is adjusted in advance in correspondence to the range over which the noise removal effect increases or decreases due to the gradation conversion so as to control the extent to which the noise is to be eliminated or retained. As a result, the contrast reduction is prevented effectively and at the same timer a clouding phenomenon is prevented as any residual noise overlay is eliminated.

The noise removal effect increase/decrease range is determined in correspondence to the difference between the gradation characteristics in the work color space and the gradation characteristics in the output color space and the contrast loss attributed to visually perceived noise amplification and edge blurring is considered to be controllable based upon the gradation characteristics differential ratio. Accordingly, the noise removal is executed in conjunction with a noise removal rate function λ(x, y) that incorporates a new element, i.e., contrast correction. This processing is executed as expressed below.

$$\tilde{S}(\vec{x}) = S(\vec{x}) - \lambda(\vec{x}) \cdot N_w(\vec{x})$$ [Expression 13]

For the luminance component;

$$\lambda(\vec{x}) = \lambda_0 \cdot \left( \frac{\frac{d\gamma}{d\hat{L}}(\tilde{\hat{L}}(\vec{x}))}{\frac{d\gamma}{d\hat{L}}\bigg|_{arg\ \gamma(\hat{L})=exposure\ level}^{standard}} \right)$$ [Expression 14]

For the chrominance components;

$$\lambda(\vec{x}) = \lambda_0 \cdot \left( \frac{\frac{d\gamma}{d\hat{L}}(\tilde{\hat{L}}(\vec{x}))}{\frac{d\gamma}{d\hat{L}}\bigg|_{arg\ \gamma(\hat{L})=saturation\ level}^{standard}} \right)$$ [Expression 15]

It is to be noted that λ(x, y) exceeding 1.0 is clipped to 1.0 as expressed below.

$$\lambda(\vec{x}) = MIN(\lambda(\vec{x}), 1.0)$$ [Expression 16]

γ represents the gradation characteristics in the output color space. If the data are converted to a color space identical to the input color space, γ will represent characteristics identical to those described in "1 Color space conversion". However, even when the gradation characteristics of the image in the output color space are different from the image gradation characteristics assumed in the input color space, the contrast ratio function can be utilized based upon the same principle in correspondence to the gradation characteristics in the output color space. Accordingly, the contrast ratio function should be computed for applications in which gradation correction is executed on the image having undergone the noise removal as well. It is to be noted that the contrast ratio function may be referred to as a contrast function as well.

The contrast ratio function is enclosed within ( ) following $\lambda_0$ on the right side of the expression for the noise removal rate function λ(x, y) described above. dγ represents the differential of the gradation characteristics in the output color space, whereas dL^ represents the differential of the gradation characteristics in the work color space. Accordingly, dγ/dL^ is the differential ratio of the gradation characteristics in the output color space and the work color space. L^(x, y) represents the luminance component L^ in the work color space, i.e., the L^a^b^ space. This luminance component is the luminance component L^ resulting from the virtual noise removal executed as described earlier in "5 Generation of virtual noise-free luminance plane". The portion corresponding to the denominator in the contrast ratio function in the expression indicates the standardization processing to be detailed later.

Accordingly, in the noise removal rate function λ(x, y), the value calculated as a function of the differential ratio of the gradation characteristics in the output color space and the work color space with the luminance value at each pixel set as a parameter thereof, is multiplied by a constant $\lambda_0$. In other words, the noise removal rate function $\lambda(x, y)$ changes in correspondence to the differential ratio of the gradation characteristics in the output color space and the gradation characteristics in the work color space, i.e., in correspondence to the difference between the extents of changes occurring in the gradation characteristics in the output color space and the gradation characteristics in the work color space, and also changes in correspondence to the brightness level at each pixel.

Figure 4A:
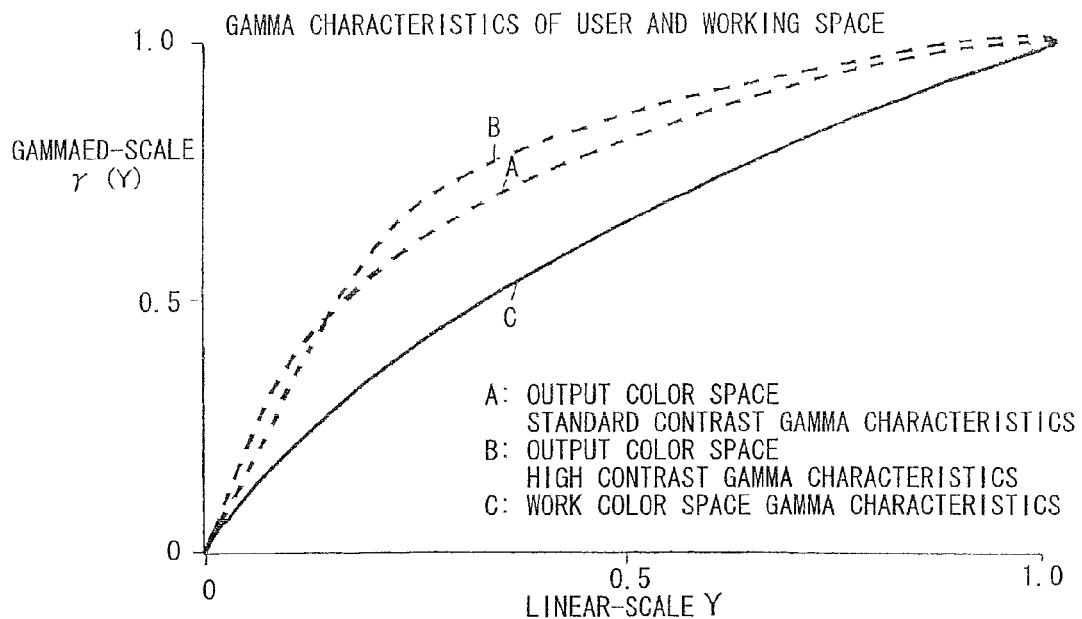
FIG. 4A shows the gamma characteristics observed in an output color space and a work color space and FIG. 4B presents a graph of the differential ratio of the gamma characteristics in the output color space and the gamma characteristics in the work color space in FIG. 4A.
Figure 4B:
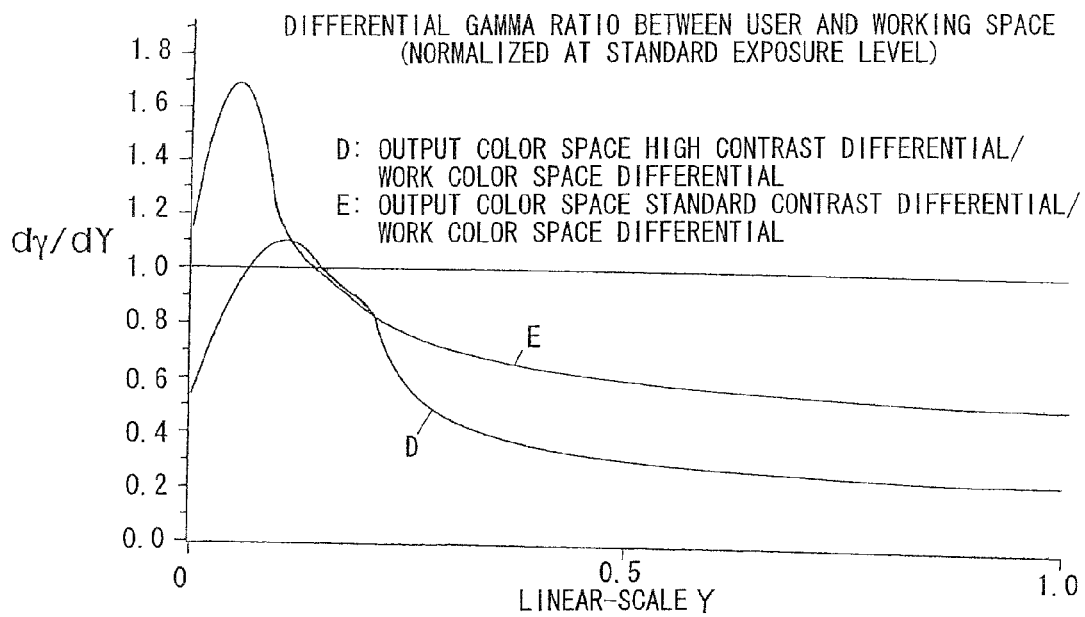

FIG. 4A presents examples of gamma characteristics that may be assumed in the output color space and the work color space. FIG. 4A shows a standard contrast gamma curve A and a high contrast gamma curve B, each representing an example of gamma characteristics in the output color space and also shows gamma characteristics C that may be assumed in the work color space. FIG. 4B presents a graph of the differential ratios of the gamma characteristics in the output color space and the gamma characteristics in the work color space shown in FIG. 4A.

Assuming the standard contrast gamma curve and the high contrast gamma curve each representing the ultimate gamma characteristics to be assumed in the output color space are available, as shown in FIG. 4A, a value indicated in FIG. 4B is selected as the differential ratio in the contrast ratio function constituting part of the noise removal rate function in correspondence to either gamma curve to be used. In addition, since the gradation characteristics in the work color space are affected by the characteristics of the input image sensor and the ISO sensitivity level, the contrast ratio function is optimized based upon two types of information indicating the output gradation characteristics and the input sensor noise characteristics.

However, since the linear gradation Y is indicated along the horizontal axis in both FIG. 4A and FIG. 4B, rescaling expressed as;

$$\frac{d\gamma}{d\hat{L}}(\tilde{L}(\vec{x})) = \frac{d\gamma(Y)}{dY} \cdot \frac{dY(\hat{L})}{d\hat{L}}(\tilde{L}(\vec{x}))$$

[Expression 17]

needs to be executed when the actual contrast ratio function is calculated. The first term on the right side represents the differential of the gamma characteristics in the output color space, whereas the second term on the right side represents the reciprocal of the differential of the gamma characteristics in the work color space. It is to be noted that the second term is regulated based upon the definition set for thin "1 Color space conversion". In order to facilitate comparison with FIG. 4A, the graph in FIG. 4B is obtained by resealing the sum of the first term and the second term on the right side in relation to the linear gradation luminance Y. The actual graph equivalent to the [Expression 17] can be obtained by resealing the horizontal axis to L^. It is to be noted that the graph in FIG. 4B represents a contrast ratio function resulting from standardization of the luminance component. Y as used in the expression is identical in meaning to $Y/Y_0$ relative to L^ in [Expression 3].

Unless the contrast function described above is incorporated, $\lambda_0$ would have to take on a value very close to 1.0 in the chrominance plane processing in order to achieve the desired color mottling noise removal effect over the middle range. It is normally desirable to retain a fraction of the noise in the luminance plane processing in order to achieve the desired level of sharpness. For this reason, $\lambda_0$ may be set to approximately 0.6. However, it has been confirmed through testing that the incorporation of the contrast function allows $\lambda_0$ for the chrominance plane processing to be set as low as the value set for $\lambda_0$ in the luminance plane processing without inducing any problems. As a result, the color contrast in a chromatically dark portion in a highlighted area can be retained with a higher level of reliability while ensuring that solid measures are taken for suppressing color mottling noise in middle range. It is to be noted that the user may be allowed to select any value for $\lambda_0$.

The contrast ratio function needs to be set by ensuring that a noise removal effect equivalent to that achieved in conjunction with $\lambda$ assuming a constant value is achieved for the overall image. For this reason, a standardization factor is used so as to standardize the noise removal rate for the luminance component at an exposure reference point. The standardization factor is equivalent to the denominator in the contrast ratio function constituting part of the noise removal rate function $\lambda(x, y)$. The noise removal rate is normally standardized at a brightness level at which exactly half the 256 gradation output, i.e., 128 levels, is achieved for the output gradation characteristics. As a result, the noise removal rate is lowered (the right side of FIG. 4B) so as to prevent contrast reduction due to edge degradation over the highlighted area which becomes compressed to a greater extent in the output gradation characteristics than in the work gradation characteristics, whereas the noise removal rate is raised (the left side in FIG. 4B) over an area where the risk of noise amplification exists with low luminance through middle range gradation contrast, as shown in FIG. 4B. However, in conjunction with certain output gradation characteristics, the noise removal rate may need to be lowered over the darkest area as in the highlighted area, in order to prevent black-clipping of the dark image structure attributable to lowered contrast. Necessary decisions are automatically made based upon the γ characteristics expression and the processing is optimized accordingly (a value close to 0 is assumed on the left side of FIG. 4B). It is to be noted that certain output gradation characteristics may be represented by a monotonously decreasing curve instead of a crested curve such as that shown in FIG. 4B.

Over a gradation range where the noise removal rate exceeds 1.0 even after being multiplied by the reference noise removal rate $\lambda_0$, the contrast in the output gradation has been raised too high to allow it to be completely canceled. Thus, the edge contrast can be retained in the highlighted area and any noise overlay in the dark area with a very low brightness level can be completely eliminated for the luminance component, providing a noise removal effect that assures a full sense of three-dimensionality by creating high contrast over an area where the highlighted portion and a low luminance portion lie adjacent to each other within an image structure. In short, the green tingeing phenomenon that often occurs in a dark image area as a result of standard noise removal is effectively prevented.

For the chrominance components, which normally require noise removal that is more intensive compared to the luminance component, it is better not to adjust the noise removal rate as dynamically as for the luminance component. Rather, the extent of noise removal is reduced over an area where the contrast can be retained without compromising the noise removal effect. In more specific terms, the noise removal rate is standardized as the saturation reference point present in an area over which the output gamma characteristics manifest as knee characteristics. A point at which output gradation characteristics of approximately 180~220 are achieved relative to the 256 gradations should be selected as the saturation reference point. Since the contrast ratio functions for the chrominance components are similar to those in FIG. 4B, except that the position of the point intersecting $d\gamma/dL^{\wedge}=1.0$ must be offset toward the brighter side, a repeated explanation is not provided.

As a result, the chrominance plane noise removal rate over a highlighted area is lowered. Since a highlighted image area normally corresponds to a high saturation area in the chrominance plane, color loss in the high saturation area is prevented and a superior color mottling noise removal effect assuring a high level of color fidelity is achieved. In addition, in a synergistic action achieved in conjunction with the dark area noise removal effect for the luminance component, any green tingeing or color mottling overlay in the dark area is completely eliminated to create a clearer image than the original image, completely devoid of cloudiness.

The measures described above keep the noise removal rate for the luminance component and the noise removal rate for the chrominance components in balance. Thus, the trade-off relationship based upon the quantum uncertainty principle between the appearance of sharp definition and the appearance of graininess, which exists only within the luminance plane, and the trade-off relationship based upon the quantum uncertainty principle between the color reproducibility and the color mottling noise suppression, which exists only within the chrominance planes, can each be optimized based upon the algorithms adopted in conjunction with the noise removal filter and in the multiresolution processing. Moreover, another trade-off issue based upon the quantum uncertainty principle that may occur between the luminance plane and the chrominance planes with regard to the graininess suppression and the colorfulness retention can also be optimized effectively. The term "graininess suppression" in this context is used to refer to minimization of graininess in the luminance plane attributed to an imbalance between the luminance and the chrominances, which may manifest when the noise removal rate for the chrominance planes is set to an excessively high level for color mottling noise suppression, relative to the noise removal rate set for the luminance plane. Such an imbalance can be minimized and the uncertainty of the graininess suppression and the colorfulness retention can be kept to a minimum when $\lambda_0$ assumes values equal to each other for the luminance plane and the chrominance planes.

9 Conversion to Output Color Space

Next, in step S4 in FIG. 2, the noise-free image in the image processing space is converted to an image in the output color space. The output color space is a standard RGB color space such as sRGB. However, the present invention is not limited to sRGB and it may be adopted in conjunction with another standard color space such as Adobe RGB, NTSC RGB or Apple RGB.

The image can be converted to that in an output color space identical to the input color space through reverse conversion processing by executing "1 Color space conversion" in reverse sequence. The image should be converted to an output color space different from the input color space through conversion executed in compliance with the specifications of the standard color spaces used as the input color space and the output color space. For instance, the input color space may be Adobe RGB color space and the output color space may be the sRGB color space. In addition, the output image may have undergone gradation correction as well as the noise removal. Such gradation correction may be executed by adjusting the gamma curve characteristics applied to the image. More specifically, A in FIG. 4A may represent the gradation characteristics of the input image and B in FIG. 4A may represent the gradation characteristics of the output image. Under such circumstances, information indicating these characteristics should be provided in advance to the noise removal processor side, so as to enable it to calculate the contrast ratio function in advance. As long as the required conditions are in place, gradation correction may be executed through retinex processing assuming varying gamma characteristics from one local area to another.

The processing executed in the first embodiment, through which any reduction in the contrast attributable to the noise removal is prevented for the entire image based upon the brightness level, may be otherwise referred to as global contrast retention processing or global contrast enhancement processing executed within the framework of the noise removal.

Second Embodiment

In reference to the second embodiment, the retinex contrast technologies for noise removal executed based upon multi-resolution representation, is described. The processing executed in the second embodiment, through which any reduction in the contrast attributable to the noise removal is prevented based upon a local edge structure taking up a local area in the image, which is also handled broad-spectrumally through multiresolution representation, may be otherwise referred to as local contrast retention processing or local contrast enhancement processing executed within the framework of noise removal.

Figure 5A:
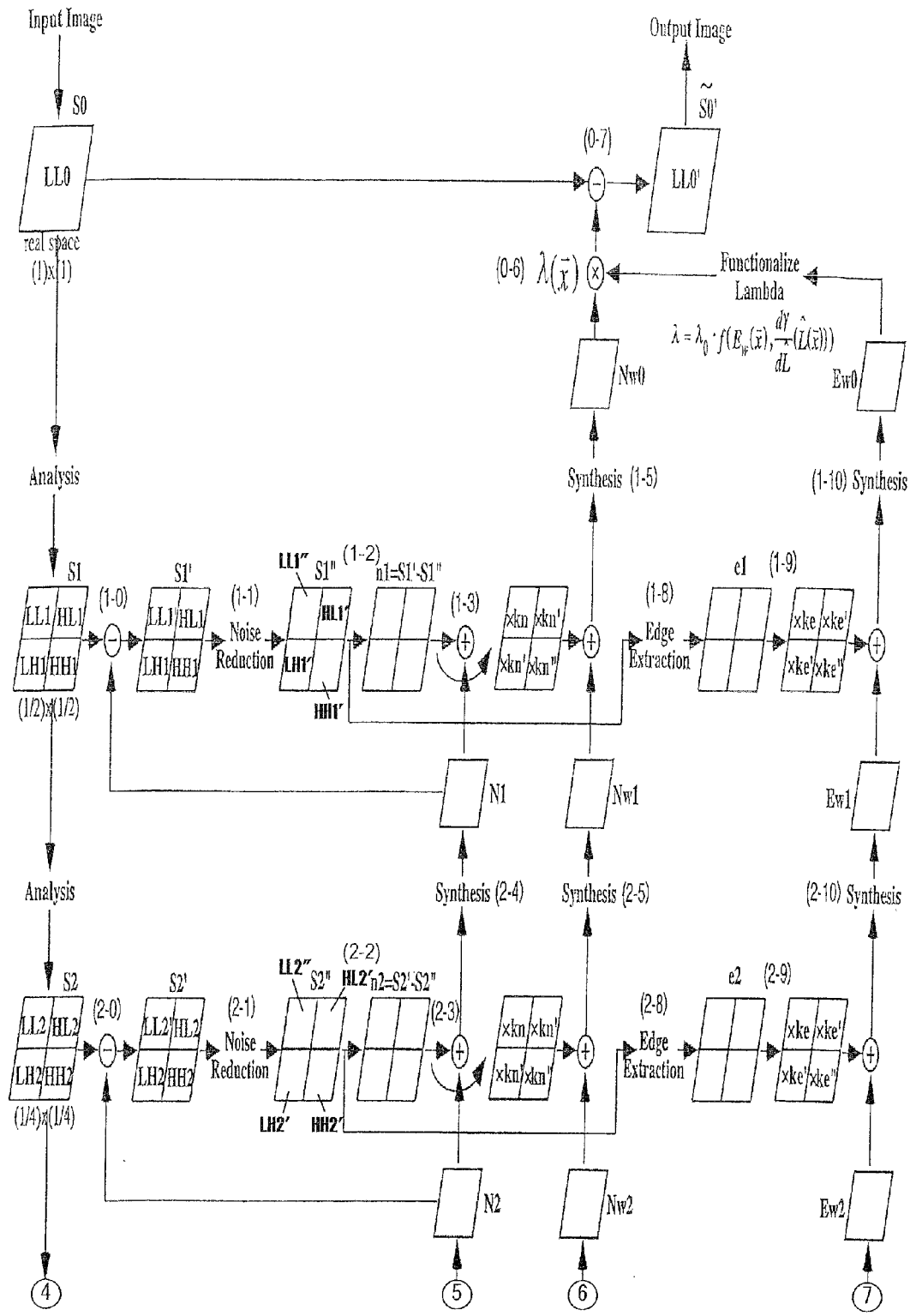
FIGS. 5A-5B present a flowchart of the noise removal processing executed based upon multiresolution representation in a second embodiment.
Figure 5B:
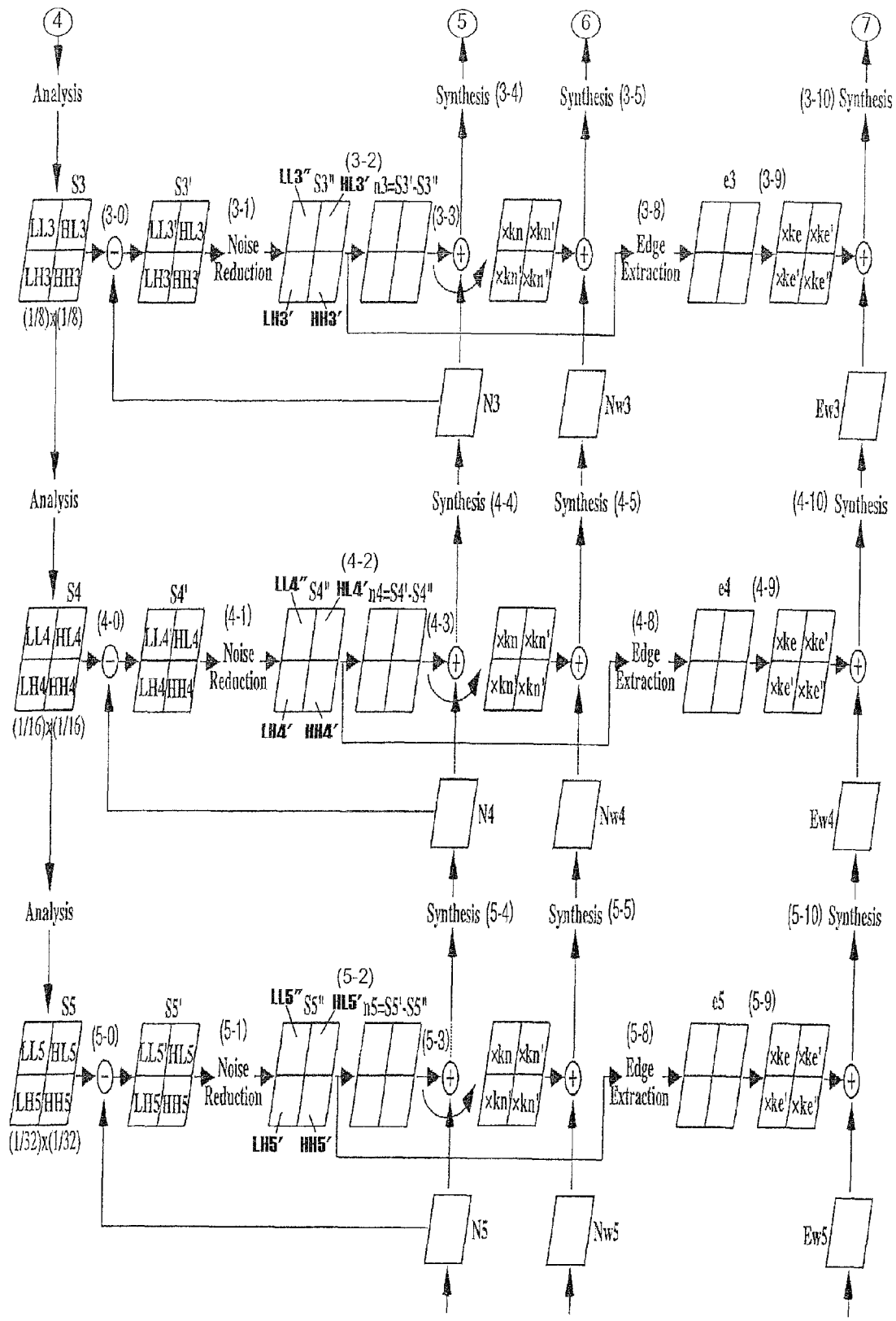

Since the image processing apparatus achieved in the second embodiment assumes a structure identical to that shown in FIG. 1 in reference to which the first embodiment has been described, a repeated explanation is not provided. In addition, since the flow of the image processing executed by the personal computer 1 in the second embodiment is similar to that in the flowchart presented in FIG. 2, a repeated explanation is not provided. FIGS. 5A-5B present a flowchart of the noise removal processing executed based upon multiresolution representation in the embodiment. The following explanation focuses on the differences from the processing executed in the first embodiment.

1 Color Space Conversion

Processing similar to that in the first embodiment is executed.

2 Multiresolution Image Representation

Processing similar to that in the first embodiment is executed.

3 Noise Extraction Through Virtual Noise Removal

Processing similar to that in the first embodiment is executed. Namely, the processing executed up to the point at which the synthesized noise component Nw0 is obtained in FIGS. 5A-5B is identical to that in the first embodiment.

4 Edge Extraction

The following explanation focuses on the processing executed at the hierarchical layer corresponding to the ¼ resolution level as an example. An edge component e2 is extracted (processing (2-5)) as expressed below from each of the subband planes (LL2", HL2', LH2', HH2') having undergone the virtual noise removal. The edge component is detected in the virtual noise-free planes instead of the initial subband planes so as to obtain an edge component unaffected by the noise. It is to be noted that the following expression is a standard expression applicable to each subband.

$$e_{ij}(\vec{x}) = \nabla^2 V'_{ij}(\vec{x}) \qquad \text{[Expression 18]}$$

The edge detection filter used in this process is a Laplacian filter. While the simplest Laplacian filter assuming a coefficient of 8 at the center and a coefficient of −1 at the periphery, defined in conjunction with a standard 3×3 filter, may be utilized, it is desirable to interlock the filtering range of the Laplacian filter with the filtering range of the noise removal filter so as to extract the residual edge remaining after the virtual noise removal with a high level of accuracy.

For instance, in conjunction with a noise removal filter with the smoothing target range set at approximately 9×9, the filtering range of the Laplacian filter, too, should be set to the matching range of approximately 9×9. The Laplacian filter, modeled on an original image-Gaussian smoothed image definition, may be expressed as follows. In the following expression, t represents a transposed matrix constituted with the product of one-dimensional separation filters.

$$\nabla^2 = 1 - (\text{Gaussian})_{9 \times 9} \quad [\text{Expression 19}]$$
$$= 1 - {}^t(1 \ 8 \ 28 \ 56 \ 70 \ 56 \ 28 \ 8 \ 1)/256 \otimes$$
$$(1 \ 8 \ 28 \ 56 \ 70 \ 56 \ 28 \ 8 \ 1)/256$$

5 Edge Synthesis

As has been described in "4Actual noise synthesis" in reference to the first embodiment, the edge component signals are synthesized through inverse wavelet transformation (processing (1-10) (2-10), (3-10), (4-10), (5-10)). The edge synthesis executed in the embodiment is expressed as follows.

$$E_w(\vec{x}) = \sum_{\substack{i=LL,LH,HL,HH \\ j=1,2,\ldots,5}} \text{Wavelet}^{-1}\{k_{eij} \cdot e_{ij}(\vec{x})\} \quad [\text{Expression 20}]$$

While an value deemed optimal should be set for the subband-to-subband weight $k_{eij}$ used in the edge synthesis, the value matching the subband-to-subband weight $k_{nij}$ used in the noise synthesis may be set for $k_{eij}$ (processing (1-9), (2-9), (3-9), (4-9), (5-9)).

6 Actual Noise Synthesis

Processing similar to that described in "4 Actual noise synthesis" in reference to the first embodiment is executed.

7 Generation of Virtual Noise-Free Luminance Plane

Processing similar to that described in "5 Generation of virtual noise-free luminance plane" in reference to the first embodiment is executed.

8 Actual Noise Removal Processing

The actual noise removal processing in the second embodiment is executed as expressed below.

$$\tilde{S}(\vec{x}) = S(\vec{x}) - \lambda(\vec{x}) \cdot N_w(\vec{x}) \quad [\text{Expression 21}]$$

for the luminance component;

$$\lambda(\vec{x}) = \lambda_0 \cdot \left( \exp\left(-\frac{E_w(\vec{x})^2}{\sigma_{geth}^2}\right) \cdot 1 + \left(1 - \exp\left(-\frac{E_w(\vec{x})^2}{\sigma_{geth}^2}\right)\right) \frac{\frac{d\gamma}{d\hat{L}}(\hat{L}(\vec{x}))}{\left.\frac{d\gamma}{d\hat{L}}\right|_{\arg \gamma(\hat{L})=\text{exposure level}}^{\text{standard}}} \right) \quad [\text{Expression 22}]$$

for the chrominance components;

$$\lambda(\vec{x}) = \lambda_0 \cdot \left( \exp\left(-\frac{E_w(\vec{x})^2}{\sigma_{geth}^2}\right) \cdot 1 + \left(1 - \exp\left(-\frac{E_w(\vec{x})^2}{\sigma_{geth}^2}\right)\right) \frac{\frac{d\gamma}{d\hat{L}}(\hat{L}(\vec{x}))}{\left.\frac{d\gamma}{d\hat{L}}\right|_{\arg \gamma(\hat{L})=\text{saturation level}}^{\text{standard}}} \right) \quad [\text{Expression 23}]$$

with $$\lambda(\vec{x}) = \text{MIN}(\lambda(\vec{x}),1.0) \quad [\text{Expression 24}]$$

The concept of global contrast retention explained in reference to the first embodiment can be developed into a concept of local contrast retention for retaining the local contrast around an edge by referencing local edge information based upon the same principle. Namely, instead of preserving the contrast by sustaining the averaged noise removal rate for the entire image, the contrast is preserved locally by sustaining an average local noise removal rate for a specific local image range. In this case, an effect equivalent to that of the processing referred to as retinex processing in the gradation correction technology is realized within the framework of noise removal technology. The local image range is the referencing range set for the edge extraction processing. However, in the embodiment in which the edge component signals are synthesized through multiresolution representation, the local contrast around the edge is preserved by broad-spectrumally viewing the edge distribution for the overall image.

The expressions provided above each indicate that correction is executed with the extent of the contrast ratio function in the noise removal rate increased further for an edge with greater edge intensity. In other words, the extent to which the contrast ratio function is taken into consideration is adjusted based upon the edge intensity. The $(1-\exp(\ ))$ in the expressions represents this adjustment. When the edge intensity is higher, the $\exp(\ )$ term assumes a value much smaller than 1 and accordingly, the contrast ratio function $d\gamma/d\,\hat{L}(\hat{L}(x, y))$ is taken into consideration to a greater extent, whereas when the edge intensity is lower, the $\exp(\ )$ term assumes a value closer to 1 and the contrast ratio function $d\gamma/d\hat{L}(\hat{L}(x, y))$ is taken into consideration to a lesser extent This means that the noise removal processing is executed with the noise removal rate adjusted in correspondence to the brightness over areas where the edge intensity is relatively high. It is to be noted that the contrast ratio function used in the embodiment is identical to the contrast ratio function having been described in reference to the first embodiment.

It is more desirable that $\sigma_{geth}$ used as the comparison reference with regard to the edge intensity assume a value representing an absolute intensity, instead of interlocking the $\sigma_{geth}$ value with the value of the noise fluctuation index value $\sigma_{th}$ used in the noise removal filter. While the $\sigma_{geth}$ value interlocking with the noise fluctuation index value normally needs to be set to $3\sigma_{th} \sim 5\sigma_{th}$ or more, it has been confirmed through testing that such a value is still insufficient. Namely, since $\sigma_{th}$ is set to $1\sigma$ relative to the noise fluctuation width, a value 3~5 times the $\sigma_{th}$ value must guarantee with substantially 100% statistical probability that the target area is an edge area assuming an intensity that can only be attributed to an edge instead of noise. However, there is a greater need for preserving the contrast around any edge area perceived to assume significant contrast in the overall image. Such an edge area can be determined based upon absolute edge intensity and, since the edge component $E_W$ over the area is bound to take on a value within the range of −256 to +256 in conjunction with the 0~256 gradation expression, $\sigma_{geth}$ should be set to, for instance, 128 or 256. In other words, the edge removal rate should be controlled particularly rigorously in correspondence to the brightness around an edge area deemed to be a crucial image element both locally and broad-spectrumally. Consequently, the contrast around edges alone can be preserved without amplifying the contrast around noise.

As the edge component intensity increases, the extent to which the noise removal intensity is adjusted relative to the brightness is increased. Namely, the noise removal intensity is increased over an image portion where the gradation characteristics corresponding to the brightness in the original image indicate a high contrast level relative to predetermined reference gradation characteristics, and the noise removal intensity is lowered over an image portion with low contrast. In addition, as the edge component intensity decreases, the noise removal intensity relative to the brightness is adjusted to a lesser extent and the noise removal execution is stabilized.

In addition, a function that undergoes a monotonous increase relative to the edge component intensity is used in the expressions to adjust the extent to which the contrast ratio function is factored in, with respect to the brightness set based upon the difference between the gradation characteristics.

Since the synthesized edge component information detected through the multiresolution representation is used as the reference edge information, any edge structure is detected with accuracy both on a local level and on the level of the overall image in the embodiment. The contrast ratio function is applied more rigorously over the vicinity of an edge that is bound to be most affected by erroneous noise component extraction, so as to preserve the edge contrast in the area. In addition, even over an area where the noise component is extracted accurately, the concept of the embodiment can still be effectively applied in the contrast correction executed by controlling the extent to which noise is eliminated/retained based upon the noise removal rate. This principle is equally valid in the first embodiment.

Through the embodiment that assumes a local viewpoint to prevent the contrast from becoming lowered by preserving any edge in the original image intact and assures effective noise removal, advantages similar to those of the first embodiment are achieved. Namely, a sense of three-dimensionality with rich contrast is rendered via the luminance component, colorfulness with rich contrast is rendered via the chrominance components, black is rendered with good purity over the overall image and a clear image without color overlay in dark areas is generated.

It is to be noted that the contrast function is incorporated in $\lambda$ simply by focusing on maintaining optimal noise removal intensity over areas around edges in the second embodiment. Accordingly, while $\lambda_0$ (luminance) can be set equal to $\lambda_0$ (chrominances) in the first embodiment, which ensures that the desired noise removal intensity is maintained over the entire image, it is necessary to select settings in the second embodiment so that $\lambda_0$ (luminance)<$\lambda_0$ (chrominances), as in the state before the contrast function is incorporated, in order to achieve a desired color mottling noise removal effect.

9 Conversion to Output Color Space

Processing similar to that in the first embodiment is executed.

Third Embodiment

The concept of the gamma contrast correction applied in noise removal (global contrast retention) in the first embodiment and the concept of the retinex contrast correction applied in noise removal (local contrast retention) in the second embodiment are adopted in combination in the third embodiment. The processing in the third embodiment is executed based upon multiresolution representation, as in the first and second embodiments.

While the first and second embodiments each aim to retain as much as possible the contrast in the original image either through the broad-spectrum approach or from a local viewpoint and thus, these two approaches may each have a certain blind spot where some pixels are left out from the contrast ratio function application, all the pixels that should be selected for the contrast ratio function application are picked without fail through the third embodiment adopting the concept of the first and second embodiments in combination. Moreover, depending upon specifically how the contrast ratio function is applied, the processing in the third embodiment may be executed to fulfill a purpose beyond the contrast retention, such as deliberate contrast emphasis.

Since the image processing apparatus achieved in the third embodiment assumes a structure identical to that shown in FIG. 1 in reference to which the first embodiment has been described, a repeated explanation is not provided. In addition, since the flow of the image processing executed by the personal computer 1 in the third embodiment is similar to that in the flowchart presented in FIG. 2, a repeated explanation is not provided. The following explanation focuses on the differences from the processing executed in the first embodiment.

Processing similar to that executed in the second embodiment is executed in "1 Color space conversion", through "7 Generation of virtual noise-free luminance plane".

8 Actual Noise Removal Processing

The actual noise removal processing executed in the third embodiment is identical to that in the second embodiment, except that the noise removal rate function is modified as follows.

for the luminance component;

$$\lambda(\vec{x}) = \lambda_0 \cdot \left( (1 - \alpha_{global}) \cdot 1 + \alpha_{global} \frac{\frac{d\gamma}{d\hat{L}}(\tilde{\hat{L}}(\vec{x}))}{\frac{d\gamma}{d\hat{L}}\bigg|_{arg\ \gamma(\hat{L})=exposure\ level}^{standard}} \right) \cdot$$  [Expression 25]

$$\left( \exp\left(-\frac{E_w(\vec{x})^2}{\sigma_{ge\ th}^2}\right) \cdot 1 + \left(1 - \exp\left(-\frac{E_w(\vec{x})^2}{\sigma_{ge\ th}^2}\right)\right) \frac{\frac{d\gamma}{d\hat{L}}(\tilde{\hat{L}}(\vec{x}))}{\frac{d\gamma}{d\hat{L}}\bigg|_{arg\ \gamma(\hat{L})=exposure\ level}^{standard}} \right)$$

for the chrominance components;

$$\lambda(\vec{x}) = \lambda_0 \cdot \left( (1 - \alpha_{global}) \cdot 1 + \alpha_{global} \frac{\frac{d\gamma}{d\hat{L}}(\tilde{\hat{L}}(\vec{x}))}{\frac{d\gamma}{d\hat{L}}\bigg|_{arg\ \gamma(\hat{L})=saturation\ level}^{standard}} \right) \cdot$$  [Expression 26]

-continued $$\left( \begin{array}{l} \exp\left(-\dfrac{E_w(\vec{x})^2}{\sigma_{geth}^2}\right) \cdot 1 + \\ \left(1 - \exp\left(-\dfrac{E_w(\vec{x})^2}{\sigma_{geth}^2}\right)\right) \dfrac{\dfrac{d\gamma}{d\hat{L}}\left(\tilde{\hat{L}}(\vec{x})\right)}{\left.\dfrac{d\gamma}{d\hat{L}}\right|_{arg\ \gamma(\hat{L})=saturation\ level}^{standard}} \end{array} \right)$$

The individual adjustment parameters should be set to the optimal values, separately for the luminance and for the chrominances. $\sigma_{geth}$ must assume a value representing an absolute edge intensity satisfying the condition of being at least 3~5 times the noise fluctuation index value $\sigma_{th}$ for each color plane, as in the second embodiment. In the embodiment, an adjustment parameter $\alpha_{global}$ is incorporated in relation to the uniform noise removal rate in the global contrast preservation term. $\alpha_{global}$ may be set to 1 under normal circumstances, since the global contrast preservation and the local contrast preservation are meant to be complementary to each other. It is to be noted that a similar modification may also be made in the first embodiment.

In addition, the concept of the first embodiment and the concept of the second embodiment are applied in a complementary manner with regard to the value selected for $\lambda_0$. Thus, the concept of the first embodiment through which the influence of any uncertainty factors that may exist in the relationship between the luminance and the chrominances can be kept to a minimum, works effectively as $\lambda_0$ (luminance) is set equal to $\lambda_0$ (chrominances), as in the first embodiment, to assure both desirable colorfulness in the chrominance planes and minimum graininess at the luminance plane. At the same time, the concept of the second embodiment works to advantage to assure better color contrast retention and color tone reproduction with better depth.

9 Conversion to Output Color Space

Processing similar to that in the first embodiment is executed.

In the third embodiment, even pixels that cannot be picked for the contrast ratio function application in the first embodiment or the second embodiment can all be selected without fail. In other words, with the concept of the first embodiment and the concept of the second embodiment adopted in combination to cover each other's blind spots, a clear image devoid of overlays or clouding can be provided.

Fourth Embodiment

Today, noise removal processing is often executed by applying a very large noise removal filter directly on the actual spatial plane, instead of removing noise by adopting a multiresolution technology as has been described in reference to the first through third embodiments. The following is a description of an example of a large filter application given in reference to the fourth embodiment. In the fourth embodiment, the concept of the third embodiment is adopted in the real space. Since the concepts of the first and second embodiments may easily be adopted in the real space based upon the description given herein, a repeated explanation is not provided.

Figure 6:
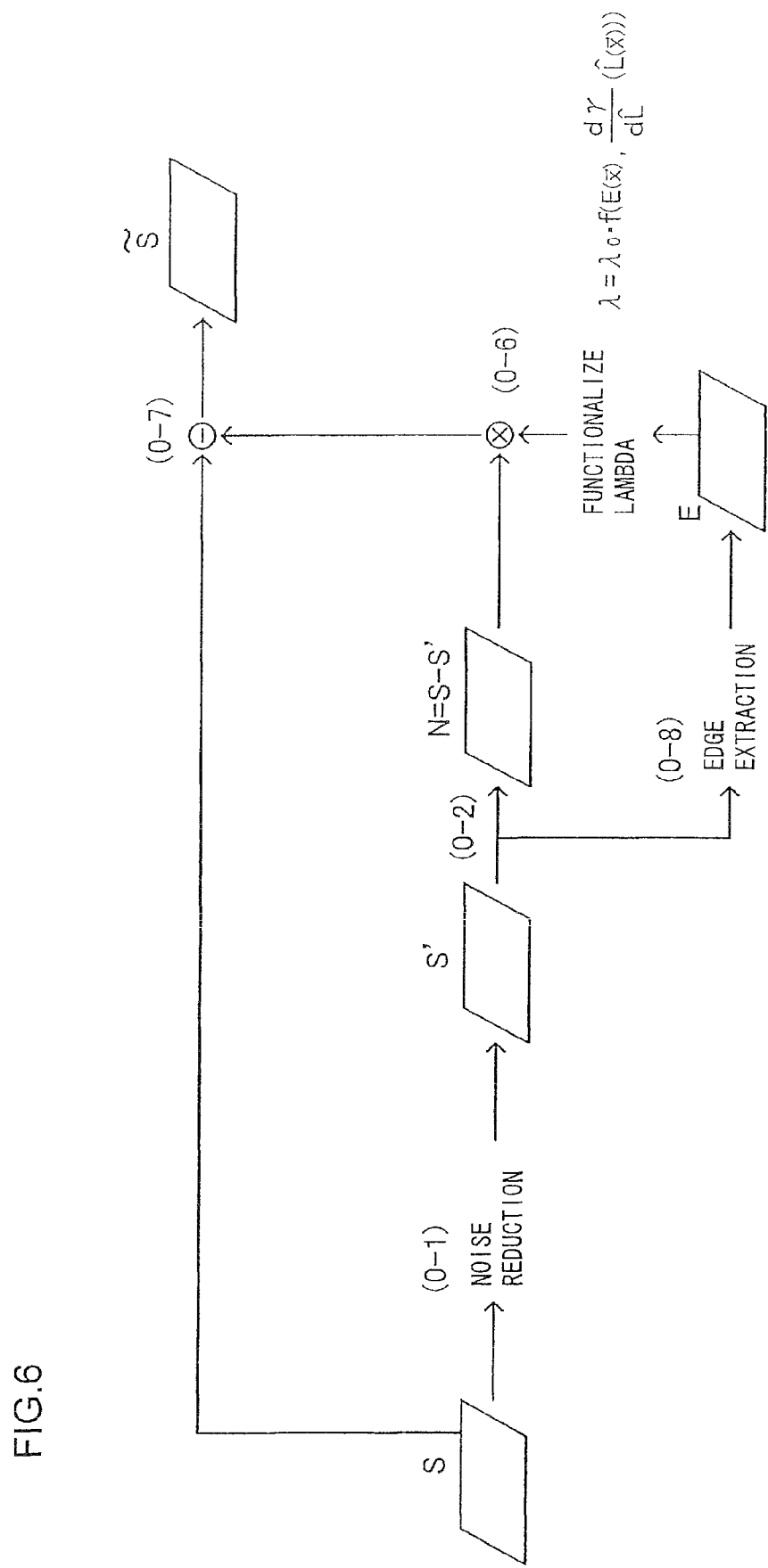
FIG. 6 presents a flowchart of the noise removal processing executed in a fourth embodiment.

Since the image processing apparatus achieved in the fourth embodiment assumes a structure identical to that shown in FIG. 1 in reference to which the first embodiment has been described, a repeated explanation is not provided. In addition, since the flow of the image processing executed by the personal computer 1 in the fourth embodiment is similar to that in the flowchart presented in FIG. 2, a repeated explanation is not provided. The following explanation focuses on the differences from the processing executed in the first embodiment. FIG. 6 presents a flowchart of the noise removal processing executed in the fourth embodiment.

1 Color Space Conversion

Processing similar to that in the first embodiment is executed.

2 Noise Extraction Processing Through Virtual Noise Removal

Since the actual spatial plane is represented by S(x, y), processing similar to that executed on the subband plane V(x, y) in the first embodiment should be executed simply by substituting S for V. However, a greater integrating range must be assumed.

2-1 Noise Removal Processing

While the noise removal processing may be executed through any processing method in order to create the smoothed plane S' by using a σ filter, an ε filter or the like as the noise removal filter, the noise removal processing in the embodiment is executed by using the modified bilateral filter expressed below, as in the first embodiment (processing (0-1).

$$S'(\vec{x}) = \dfrac{\displaystyle\int_{|\vec{x}'-\vec{x}|\le 2r_{th}} S(\vec{x}')\exp\left(-\dfrac{|S(\vec{x}')-S(\vec{x})|^2}{\sigma_{th}^2} \cdot \dfrac{|\vec{x}'-\vec{x}|^2}{r_{th}^2}\right) d\vec{x}'}{\displaystyle\int_{|\vec{x}'-\vec{x}|\le 2r_{th}} \exp\left(-\dfrac{|S(\vec{x}')-S(\vec{x})|^2}{\sigma_{th}^2} \cdot \dfrac{|\vec{x}'-\vec{x}|^2}{r_{th}^2}\right) d\vec{x}'}$$ [Expression 27]

While it is desirable to assume a value of, for instance, 50 for rth and select a pixel range of approximately 101×101 in order to achieve a truly clean noise removal effect, the following explanation is provided by assuming, for purposes of simplification, that rth=12 and that the integration is executed over a pixel range of 25×25. However, if the processing is executed by using a σ filter or an ε filter that is not affected by any spatial factor, there is no parameter equivalent to rth and thus, only the integrating range needs to be set.

2-2 Noise Extraction Processing

The noise extraction processing is executed as expressed below (processing (0-2)).

$$N(\vec{x})=S(\vec{x})-S'(\vec{x})$$ [Expression 28]

3 Edge Extraction

The edge component E is extracted (processing (0-8)) from the actual spatial plane having undergone the virtual noise removal.

$$E(\vec{x})=\nabla^2 S'(\vec{x})$$ [Expression 29]

A Laplacian filter is used as the edge detection filter in this process. While a Laplacian filter assuming a 9×9 pixel range, identical to that in the first embodiment, may be used, it is more desirable to set the filtering range to approximately 25×25 since the filtering range of the smoothing filter is set to 25×25. A 25×25 Laplacian filter can be created simply by determining the difference between a smoothed image resulting from three applications of a 9×9 Gaussian filter and the original image. Namely, the 25×25 Laplacian filter may be expressed as below.

$$\nabla^2 = 1 - (\text{Gaussian})_{25 \times 25} \quad [\text{Expression 30}]$$
$$= 1 - (\text{Gaussian})_{9 \times 9} \otimes$$
$$(\text{Gaussian})_{9 \times 9} \otimes (\text{Gaussian})_{9 \times 9}$$

4 Generation of Virtual Noise-Free Luminance Plane

In order to obtain a noise-free reference luminance plane to be used in the subsequent processing, i.e., "5 Actual noise removal processing", a temporary virtual noise-free luminance plane is generated by using 100% of the extracted noise component. While this processing is not shown in FIG. 6, it is equivalent to generating a virtual noise-free luminance plane through processing (0-7) without executing processing (0-6) in FIG. 6. The virtual noise-free luminance plane thus generated is then used in processing (0-6) described below.

$$\tilde{\hat{L}}(\vec{x}) = \hat{L}(\vec{x}) - N(\vec{x}) \quad [\text{Expression 31}]$$

However, this processing may be skipped under certain circumstances and, in such a case, the luminance plane L^(x, y) of the original image that has not undergone noise removal may be used in place of the virtual noise-free luminance plane.

5 Actual Noise Removal Processing

The extracted noise component N undergoes the processing described below (processing (0-6)) and then the actual noise removal is executed (processing (0-7)) by actually subtracting the noise component from the original image S. The noise removal rate is set in the embodiment as in the third embodiment, as indicated below. However, the noise removal may be set as in the first embodiment or in the second embodiment, instead.

$$\tilde{S}(\vec{x}) = S(\vec{x}) - \lambda(\vec{x}) \cdot N(\vec{x}) \quad [\text{Expression 32}]$$

for the luminance component;

$$\lambda(\vec{x}) = \lambda_0 \cdot \left( (1 - \alpha_{global}) \cdot 1 + \alpha_{global} \frac{\frac{d\gamma}{d\hat{L}}(\tilde{\hat{L}}(\vec{x}))}{\frac{d\gamma}{d\hat{L}}\bigg|_{arg\ \gamma(\hat{L})=exposure\ level}^{standard}} \right) \quad [\text{Expression 33}]$$

$$\left( \begin{array}{l} \exp\left(-\frac{E(\vec{x})^2}{\sigma_{geth}^2}\right) \cdot 1 + \\ \left(1 - \exp\left(-\frac{E(\vec{x})^2}{\sigma_{geth}^2}\right)\right) \frac{\frac{d\gamma}{d\hat{L}}(\tilde{\hat{L}}(\vec{x}))}{\frac{d\gamma}{d\hat{L}}\bigg|_{arg\ \gamma(\hat{L})=exposure\ level}^{standard}} \end{array} \right)$$

for the chrominance components;

$$\lambda(\vec{x}) = \lambda_0 \cdot \left( (1 - \alpha_{global}) \cdot 1 + \alpha_{global} \frac{\frac{d\gamma}{d\hat{L}}(\tilde{\hat{L}}(\vec{x}))}{\frac{d\gamma}{d\hat{L}}\bigg|_{arg\ \gamma(\hat{L})=saturation\ level}^{standard}} \right) \quad [\text{Expression 34}]$$

$$\left( \begin{array}{l} \exp\left(-\frac{E(\vec{x})^2}{\sigma_{geth}^2}\right) \cdot 1 + \\ \left(1 - \exp\left(-\frac{E(\vec{x})^2}{\sigma_{geth}^2}\right)\right) \frac{\frac{d\gamma}{d\hat{L}}(\tilde{\hat{L}}(\vec{x}))}{\frac{d\gamma}{d\hat{L}}\bigg|_{arg\ \gamma(\hat{L})=saturation\ level}^{standard}} \end{array} \right)$$

with $$\lambda(\vec{x}) = \text{MIN}(\lambda(\vec{x}), 1.0) \quad [\text{Expression 35}]$$

7 Conversion to Output Color Space

Processing similar to that in the first embodiment is executed.

As described above, accurate noise removal processing can be executed with ease in the actual spatial plane simply by incorporating a contrast ratio function in the noise removal rate within the work color space in which the image processing is executed.

The contrast ratio function can be calculated in software without requiring significant processing time. In addition, since the contrast ratio function can be ascertained in advance, it may be provided in a lookup table in hardware.

(Variations)

It is to be noted that while the image processing space described in reference to the embodiments is the optimal color space, i.e., a uniform color·uniform noise space, the present invention may also be adopted in a standard uniform color space by defining a similar contrast ratio function. For instance, the present invention may be adopted in the CIE-defined L*a*b* space, the L*u*v* space or the CIECAM02 space. The optimal contrast ratio function should be determined in correspondence to each space based upon the gradation characteristics defined for the particular work color space and the gradation characteristics of the output color space.

In addition, while the description has been given above on an example in which the present invention is adopted in conjunction with the most advanced multiresolution representation technology, whereby both low-frequency subbands and high-frequency subbands are used, the present invention may instead be adopted in conjunction with any other technology available in the related art. This principle applies in the real space processing as well.

The edge contrast-retaining mechanism, achieved either through the gamma contrast correction or the retinex contrast correction, for retaining the edge contrast that otherwise may become lost through the noise removal filter, also works effectively when the concept assuming the identical definition is adopted in a uniform color space that does not assure uniform noise. A greater extent of improvement in the noise extraction accuracy may actually be achieved under circumstances in which noise cannot be extracted accurately and the noise component includes a higher edge content since the edge will be preserved through noise removal rate control. However, it will be obvious that a higher image quality is ultimately achieved through noise removal executed in a space assuring uniform noise.

FIGS. 4A and 4B show examples of dγ/dY function curves that provide contrast ratio functions dγ/dL^ respectively when the gradation characteristics in the output color space are in the normal contrast mode and when the gradation characteristics in the output color are in the high contrast mode. Other typical examples for function curves include those expressed below. It is assumed that Y in the expressions represents the brightness level in the linear gradation as does the corresponding letter in FIGS. 4A and 4B with the reference level standardized to fit within a range of 0~1.0. In addition, some of the details of the expression provided to indicate the necessary procedure to be followed through the calculation process, may represent an approximation. As explained earlier, the contrast ratio function may be calculated as;

$$\frac{d\gamma}{d\hat{L}} = \frac{d\gamma}{dY} \cdot \left(\frac{d\hat{L}}{dY}\right)^{-1}$$ [Expression 36]

1-1 When the output color space is the sRGB color space assuming sRGB-compliant gradation characteristics
γ(Y)=12.92*Y 0=<Y=<0.0031308
γ(Y)=1.055*Y^(1/2.4)–0.055 0.0031308=<x=<1
1-2 When the output color space is the Adobe RGB color space assuming Adobe-RGB-compliant gradation characteristics
γ(Y)=Y^(1/2.19921875) 0=<Y=<1
dγ/dY in the first term can be calculated as expressed above.
2-1 When the spectral sensitivity of the input image is equivalent to ISO 6400

$$\hat{L}(Y) = 100 \cdot \frac{\sqrt{Y+\varepsilon} - \sqrt{\varepsilon}}{\sqrt{Y+\varepsilon} - \sqrt{\varepsilon}}$$ [Expression 37]

with ε=0.05
2-2 When the spectral sensitivity of the input image is equivalent to ISO 50

$$\hat{L}(Y) = 100 \cdot \sqrt{Y}$$ [Expression 38]

with ε=0
dγ/dL^ in the second term can be calculated as expressed above.
3 The contrast ratio function used to control the noise removal rate can be calculated as follows $$\frac{d\gamma}{d\hat{L}} = \frac{d\gamma}{dY} \cdot \left(\frac{d\hat{L}}{dY}\right)^{-1}$$ [Expression 39]

in correspondence to a specific combination of the conditions described above. Accordingly, the contrast ratio function assumes characteristics whereby it is affected by the ISO sensitivity of the input image as well as by the gradation characteristics in the output color space.
In addition, if the latest uniform color space CIECAM02 is used as the work color space as an alternative, the definition outlined above is directly adopted by regarding L^ as a symbol representing the brightness in the CIECAM02 space, as expressed below.

$$\hat{L}(Y) = \frac{400 \cdot Y^{0.42}}{Y^{0.42} + 27.13} + 0.1$$ [Expression 40]

It is to be noted that since the brightness level Y is in proportion to the brightness parameter $F_L$ in the viewing environment and Y∝$F_L$, the brightness level may exceed 1.0.

It is to be noted also that uniform noise may be achieved for the image data in correspondence to the imaging sensitivity designated as an external condition parameter in addition to achieving uniform color in correspondence to the surrounding viewing environment conforming to the definition of the CIECAM02 color space. In such a variation, an offset signal ε corresponding to the imaging sensitivity incorporated in the uniform color·uniform noise space L^a^b^ may be applied to the brightness Y assuming a linear gradation and the definition may be modified with the following substitution.

$$Y^{0.42} \rightarrow (Y+\varepsilon)^{0.42}$$ [Expression 41]

dγ/dL^ in the second term can be calculated based upon the work gradation characteristics thus defined.
While an explanation is given above in reference to the embodiments on an example in which the noise removal processing is executed on both the luminance component and the chrominance components, the noise removal processing may instead be executed on either of them only
As described above, in the first through fourth embodiments, a superfine noise removal effect assuring a high level of textural richness reproducibility can be achieved while retaining the initial contrast, saturation, clarity and the like of the original image.
Since the purity of the extracted noise component is greatly improved by projecting the image into the image processing space, the balance can be adjusted within the image based upon the noise removal rate without having to uniformly remove the noise. As a result, an added advantage is achieved in that the contrast can be emphasized through the adjustment of the extent to which noise is eliminated or retained while maintaining noise suppression for the overall image at a level comparable to that achieved through the uniform noise removal. The balance may be adjusted through a brightness-dependent contrast preserving method through which the contrast is preserved for the overall image (the first embodiment) or through an edge structure-dependent contrast preserving method through which the contrast is preserved on the local level (the second embodiment). Either of these methods provides a noise removal effect assuring a high level of textural richness reproducibility.
In addition, since the optimal contrast ratio function is determined based upon the gradation characteristics in the output color space and the gradation characteristics in the work color space, noise removal can be executed by retaining the initial contrast in the original image to the maximum degree without amplifying the noise. Namely, by determining the contrast ratio function based upon the differential ratio of the gradation characteristics and controlling the noise removal rate with the contrast ratio function, the contrast, which may otherwise become lost through the noise removal, is retained and a contrast emphasizing effect comparable to that of the standard gradation correction technology is realized as part of the noise removal technology.
More specifically, the contrast emphasizing effect on the luminance component creates a desirable three-dimensionality and sharp edge definition with the difference between the contrast in a bright area and the contrast in a dark area, the contrast emphasizing effect on the chrominance components sustains the colorfulness in a highly saturated area and high contrast noise removal results with good color rendition are achieved over an image area that is on the whole shaded. Furthermore, since the noise component alone is eliminated while retaining the initial contrast in the original image to a maximum extent, a cleaner image reproducing clearer textural richness, even compared to the original image, which is devoid of noise overlay, can be provided. These advantages are likely to become more marked in an image with a wider dynamic range.

Moreover, the advantages can be realized with ease simply by incorporating a function corresponding to a specific image position in the noise removal rate after the noise component is extracted.

There is a further advantage in that the technology can be adopted with a high level of versatility even in conjunction with a given type of gradation correction executed after the noise removal.

The present invention differs from the related art disclosed in patent reference 5 in that robust noise removal can be achieved without losing the edge contrast in a high contrast edge area. In other words, the two seemingly conflicting requirements, i.e., noise removal and edge structure preservation, are satisfied at the same time. Consequently, a sense of transparency is created over the high contrast edge area having undergone the noise removal.

It is to be noted that the noise component having been extracted through the smoothing processing executed on the original image (the original image in the work color space) is further optimized by using the noise removal rate λ(x, y) and the noise thus optimized is subtracted from the original image in the embodiments described above. This means that processing is executed by setting the smoothing intensity to an optimal level for the original image. Namely, the noise-tree image is created by selecting the optimal smoothing intensity level for the original image based upon the difference between the gradation characteristics in the work color space and the gradation characteristics in the output color space.

Generally speaking, acquisition of a noise-free image achieved through noise removal rate control and acquisition of a noise-free image achieved through control of the smoothed image/original image mixing ratio, are mathematically equivalent to each other. Accordingly, the smoothing intensity is controlled either by adjusting the mixing ratio for the smoothed image having been smoothed through a specific type of smoothing processing and the original image or by adjusting the subtraction ratio at which the noise component, having been extracted based upon the difference between the original image and the smoothed image, is subtracted from the original image.

In addition, since the smoothing intensity for the original image is set to the optimal level based upon the difference between the gradation characteristics in the work color space and the gradation characteristics in the output color spacer the smoothing intensity corresponding to the noise-free image following the conversion to the output color space is homogenized in correspondence to various types of gradation assumed in the image signals expressing the original image.

Through the use of the contrast ratio function in which the contrast ratio, determined based upon the difference between the gradation characteristics in the work color space and the gradation characteristics in the output color space, changes in correspondence to the brightness level in the original image, the extent to which the contrast ratio, determined based upon the difference in the gradation characteristics between the work color space, is reflected in the smoothing intensity is adjusted in correspondence to the brightness level in the original image.

In the second embodiment, noise removal processing is executed with varying smoothing intensity levels in correspondence to the brightness over image areas where the detected edge intensity is relatively or absolutely high. The processing executed in the second embodiment by assuming a variable smoothing intensity can be summarized as follows.

As the intensity of the extracted edge component increases, a noise-free image is generated by selecting a smoothing intensity setting whereby the extent of smoothing intensity adjustment relative to the brightness is increased. Over an image area with a relatively high edge intensity level, the smoothing intensity is increased at a position where the gradation characteristics corresponding to the brightness in the original image indicate more intense contrast relative to predetermined gradation characteristics but the smoothing intensity is decreased at a position with low contrast.

The extent of adjustment of the smoothing intensity relative to the brightness, which is based upon the difference between the gradation characteristics in the work color space and the gradation characteristics in the output color space, is gradually decreased so that the processing is executed with more constant smoothing intensity as the edge component intensity decreases.

The extent to which the smoothing intensity is adjusted relative to the brightness is increased/decreased by using a function that monotonously increases relative to the edge component intensity, in conjunction with the contrast ratio function corresponding to the brightness, which is set based upon the difference in the gradation characteristics.

While the smoothing intensity corresponding to the brightness level in the image is normally set to a lower level over a higher luminance range relative to the medium luminance level, it may be set to a lower level over a lower luminance range relative to the medium luminance level when certain output gradation characteristics and certain work gradation characteristics are assumed in combination. This latter setting may be selected in any of the embodiments described herein. In such a case, the smoothing intensity for image signals present near a detected edge is set based upon the difference between the gradation characteristics in the work color space and the gradation characteristics in the output color space and a noise-free image is created based upon the selected smoothing intensity level.

The smoothing intensity in the work color space is set so that the smoothing intensity for the noise-free image following the conversion to the output color space is homogenized relative to the individual gradation levels assumed in the image signals present near the detected edge. In correspondence to the intensity of the detected edge component, the extent to which the contrast, determined based upon the difference in the gradation characteristics between the work color space and the output color space, is reflected in the smoothing intensity, is adjusted.

The edge detection in the second through fourth embodiments, executed by extracting the edge component in the work color space having undergone gamma correction, is expressed as the definition for a differential filter. By rewriting [Expression 19] presented earlier, the processing executed on the image signal $V_g(x, y)$ having undergone the gamma correction can be expressed as the following add/subtract processing.

$$\nabla^2 V_g(x,y) = V_g(x,y) - \langle V_g(x,y) \rangle \qquad \text{[Expression 42]}$$

Since logarithmic conversion can be executed in approximation for the linear gradation data through the gamma correction, the edge detection processing executed in the gamma space can also be regarded as an arithmetic operation through which the ratio of the value indicated that a given pixel and the average of the values indicated at nearby pixels in the linear space is determined. Such an arithmetic operation may be written as follows.

$$V_g(x,y) \cong \log V_{lin}(x,y) \quad \text{[Expression 43]}$$

$$V_g(x,y) - \langle V_g(x,y) \rangle \cong \log(V_{lin}(x,y)/\langle V_{lin}(x,y) \rangle) \quad \text{[Expression 44]}$$

This concept is closely connected with the contrast correction executed based upon the ratio of the value at that target pixel and the local average in the retinex theory. Thus, the processing executed in the second embodiment based upon multiresolution representation may be regarded as multiscale retinex processing executed as part of a noise removal process. The processing executed in the fourth embodiments, on the other hand, may be regarded as single-scale retinex processing incorporated in a noise removal process.

Figure 7:
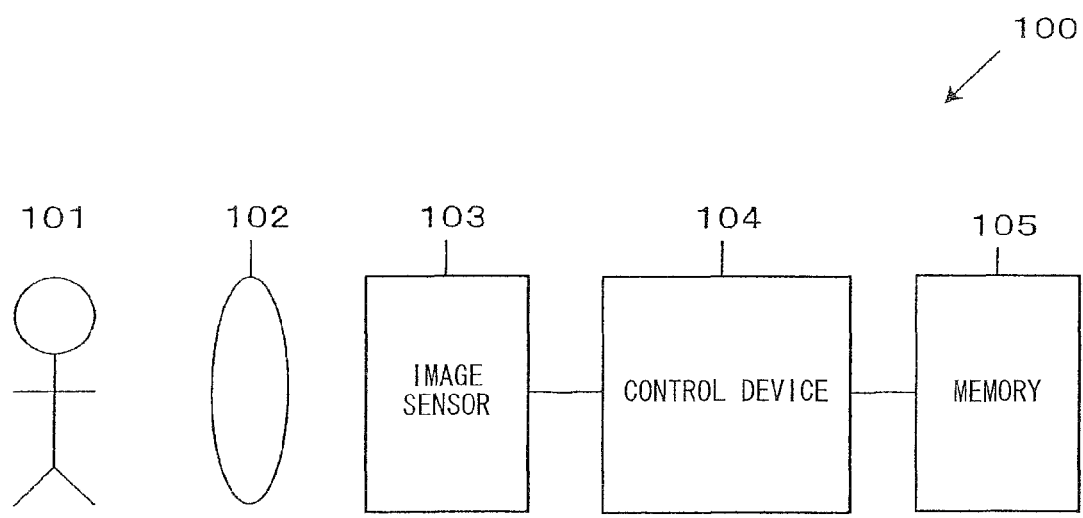
FIG. 7 shows the structure of the digital camera 100.

It is to be noted that an explanation has been given above in reference to the embodiments and variations on an example in which the image processing apparatus is constituted with a personal computer 1. However, the noise removal processing executed in the personal computer 1 in the description provided above may instead be executed in a digital camera (electronic camera). FIG. 7 shows the structure of such a digital camera 100. The digital camera 100 includes a photographic lens 102, an image sensor 103 constituted with a CCD or the like, a control device 104 constituted with a CPU and peripheral circuits, a memory 105 and the like.

The image sensor 103 photographs (captures an image of) a subject 101 via the photographic lens 102 and outputs image data obtained through the photographing operation to the control device 104. This processing is equivalent to the image data input executed in step S1 in FIG. 2 in reference to which the first embodiment has been described. The control device 104 executes the noise removal processing in any of the embodiments or their variations having been described earlier on the image data obtained through the photographing operation executed at the image sensor 103 and stores the image data resulting from the optimal noise removal into the memory 105 as needed. The control device 104 executes the noise removal processing described earlier based upon a specific program stored in a ROM (not shown) or the like.

As described above, noise removal assuring a high level of reproducible image quality is enabled in the digital camera 100 and the image data resulting from the optimal noise removal can then be stored into the memory 105 and recorded into a recording medium such as a detachable memory card.

While the invention has been particularly shown and described with respect to the embodiments and variations thereof by referring to the attached drawings, the present invention is not limited to these examples and it will be understood by those skilled in the art that various changes in form and detail may be made therein without departing from the spirit, scope and teaching of the invention.

What is claimed is:

1. An image processing method for removing a noise component contained in an original image, comprising:
   extracting a noise component contained in an original image in a work color space;
   creating a noise-free image in the work color space based upon the extracted noise component and a ratio between a differential of gradation characteristics in an output color space and a differential of gradation characteristics in the work color space;
   converting the noise-free image in the work color space to an image in the output color space.

2. An image processing method according to claim 1, wherein:
   an extent of the ratio between the differential of the gradation characteristics in the output color space and the differential of the gradation characteristics in the work color space changes in correspondence to a brightness level in the work color space.

3. An image processing method according to claim 1, wherein:
   a contrast ratio function relative to a brightness level is set based upon the differential of the gradation characteristics in the output color space and the differential of the gradation characteristics in the work color space; and
   the noise-free image is created based upon the contrast ratio function having been set.

4. An image processing method according to claim 1, wherein:
   a subtraction ratio at which the extracted noise component is subtracted from the original image is controlled based upon the ratio between the differential of the gradation characteristics in the output color space and the differential of the gradation characteristics in the work color space.

5. An image processing method according to claim 1, wherein:
   the work color space is at least one of a uniform noise space, a uniform color space, and a uniform color·uniform noise space assuring both uniform color and uniform noise.

6. An image processing method according to claim 1, wherein:
   an extent of noise removal is set to a large value in advance for a gradation area where the noise component is bound to be amplified through gradation conversion to the output color space and the extent of noise removal is set to a small value in advance for a gradation area where the noise component is bound to be attenuated through the gradation conversion to the output color space.

7. An image processing method according to claim 1, wherein:
   the original image is converted to an image in the work color space assuming gradation characteristics varying in correspondence to imaging sensitivity with which the original image has been captured.

8. An image processing method according to claim 1, wherein:
   the output color space assumes gradation characteristics of a standard RGB color space.

9. An image processing method according to claim 1, wherein:
   when gradation correction processing is executed in addition to processing for removing the noise component contained in the original image and gradation characteristics of an image held in an input color space are different from the gradation characteristics of the image held in the output color space, the noise-free image is created based upon a ratio between the differential of the gradation characteristics in the output color space having undergone the gradation correction processing and the differential of the gradation characteristics in the work color space.

10. An image processing method according to claim 1, wherein:
    the original image is converted to an image in the work color space expressed with a luminance component and chrominance components and the noise-free image is created in correspondence to each color component.

11. An image processing method according to claim 1, wherein:
the original image is converted to an image in the work color space expressed with a luminance component and chrominance components and the noise-free image is created in correspondence to at least one color component.

12. An image processing method according to claim 3, wherein:
the noise-free image is created based upon the contrast ratio function and a brightness level at each local area in the image.

13. An image processing method according to claim 3, wherein:
the noise-free image is created based upon the contrast ratio function and an edge intensity level at each local area in the image.

14. An image processing method according to claim 3, wherein:
the original image is converted to an image in the work color space expressed with a luminance component and chrominance components; and
the noise-free image for the luminance component is created by setting a contrast ratio function standardized based upon a differential ratio assumed at an exposure reference point with regard to the brightness level in the work color space.

15. An image processing method according to claim 3, wherein:
the original image is converted to an image in the work color space expressed with a luminance component and chrominance components; and
the noise-free image for one of the chrominance components is created by setting a contrast ratio function standardized based upon a differential ratio assumed at a saturation reference point with regard to the brightness level in the work color space.

16. An image processing method for removing a noise component contained in an original image, comprising:
converting the original image to an image in a work color space assuming specific gradation characteristics;
creating a noise-free image by removing noise in the original image in the work color space; and
converting the noise-free image in the work color space to an image in an output color space assuming gradation characteristics different from the gradation characteristics in the work color space, wherein
the noise-free image is created by setting smoothing intensity for the original image based upon a ratio between a differential of the gradation characteristics in the output color space and a differential of the gradation characteristics in the work color space.

17. An image processing method according to claim 16, wherein:
a smoothing intensity in the work color space is set so that a smoothing intensity for the noise-free image following conversion to the output color space is homogenized over individual gradations assumed in image signals of the original image.

18. An image processing method according to claim 16, wherein:
a contrast ratio determined based upon the ratio between the differential of the gradation characteristics in the output color space and the differential of the gradation characteristics in the work color space is reflected in the smoothing intensity to an extent corresponding to a brightness level in the original image.

19. An image processing method according to claim 16, wherein:
the smoothing intensity is controlled by adjusting a mixing ratio for a smoothed image having been smoothed through specific smoothing processing and the original image or by adjusting a subtraction ratio at which a noise component having been extracted based upon a difference between the original image and the smoothed image is subtracted from the original image.

20. An image processing method for removing a noise component contained in an original image, comprising:
creating a noise-free image through noise removal executed on the original image in a work color space assuming specific gradation characteristics; and
creating an output noise-free image by converting the noise-free image to an image in an output color space assuming gradation characteristics different from the gradation characteristics in the work color space, wherein:
an edge component is detected in the original image;
smoothing intensity for image signals present near the detected edge component is set based upon a ratio between a differential of the gradation characteristics in the output color space and a differential of the gradation characteristics in the work color space; and
the noise-free image is created based upon the smoothing intensity having been set.

21. An image processing method according to claim 20, wherein:
the smoothing intensity in the work color space is set so that smoothing intensity for the noise-free image following conversion to the output color space is homogenized over individual gradation levels of image signals present near the detected edge.

22. An image processing method according to claim 20, wherein:
a contrast determined based upon the ratio between the differential of the gradation characteristics in the output color space and the differential of the gradation characteristics in the work color space is reflected in the smoothing intensity to an extent corresponding to the intensity of the detected edge component.

23. An image processing method according to claim 22, wherein:
an edge intensity is measured by comparing the edge intensity with a predetermined value indicating an absolute edge intensity level corresponding to an achievable gradation range.

24. An image processing method according to claim 20, wherein:
the smoothing intensity is controlled by adjusting a mixing ratio for a smoothed image having been smoothed through specific smoothing processing and the original image or by adjusting a subtraction ratio at which a noise component having been extracted based upon a difference between the original image and the smoothed image is subtracted from the original image.

* * * * *